(12) United States Patent
Huang et al.

(10) Patent No.: US 7,338,647 B2
(45) Date of Patent: Mar. 4, 2008

(54) SYNTHESIS OF CATHODE ACTIVE MATERIALS

(75) Inventors: Biying Huang, Las Vegas, NV (US);
Jeffrey Swoyer, Henderson, NV (US);
M. Yazid Saidi, Henderson, NV (US);
Haitao Huang, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 645 days.

(21) Appl. No.: 10/850,003

(22) Filed: May 20, 2004

(65) Prior Publication Data

US 2005/0260494 A1 Nov. 24, 2005

(51) Int. Cl.
*C01B 25/26* (2006.01)
*C01B 25/45* (2006.01)
*C01B 33/20* (2006.01)
*C01B 17/96* (2006.01)
*C01G 28/02* (2006.01)
*C01G 30/02* (2006.01)
*C01G 31/02* (2006.01)

(52) U.S. Cl. ............... 423/306; 423/311; 423/326; 423/518; 423/544; 423/558; 423/559; 423/592.1; 423/593.1; 423/594.17; 423/594.19; 423/594.7; 423/594.8; 423/594.9; 423/602; 423/605; 423/606; 423/608; 423/617; 423/618; 423/619

(58) Field of Classification Search ............... 423/306, 423/311, 326, 518, 544, 558, 559, 592.1, 423/593.1, 594.17, 594.19, 594.7, 594.8, 423/594.9, 602, 605, 606, 608, 617, 618, 423/619

See application file for complete search history.

(56) References Cited

U.S. PATENT DOCUMENTS

| | | | |
|---|---|---|---|
| 4,018,943 | A | 4/1977 | Youtsey et al. |
| 4,136,213 | A | 1/1979 | Fung et al. |
| 4,686,116 | A | 8/1987 | Rickborn et al. |
| 5,789,114 | A | 8/1998 | Adachi et al. |
| 6,528,033 | B1 | 3/2003 | Barker et al. |
| 6,645,452 | B1 | 11/2003 | Barker et al. |
| 6,702,961 | B2 | 3/2004 | Barker et al. |

(Continued)

*Primary Examiner*—Wayne A. Langel
(74) *Attorney, Agent, or Firm*—Cynthia S. Kovacevic; Roger A. Williams; Michael D. Ross

(57) ABSTRACT

The present invention relates to a method for preparing an electroactive metal polyanion or a mixed metal polyanion comprising forming a slurry comprising a polymeric material, a solvent, a polyanion source or alkali metal polyanion source and at least one metal ion source; heating said slurry at a temperature and for a time sufficient to remove the solvent and form an essentially dried mixture; and heating said mixture at a temperature and for a time sufficient to produce an electroactive metal polyanion or electroactive mixed metal polyanion. In an alternative embodiment the present invention relates to a method for preparing a metal polyanion or a mixed metal polyanion which comprises mixing a polymeric material with a polyanion source or alternatively an alkali metal polyanion source and a source of at least one metal ion to produce a fine mixture and heating the mixture to a temperature higher than the melting point of the polymeric material, milling the resulting material and then heating the milled material. It is another object of the invention to provide electrochemically active materials produced by said methods. The electrochemically active materials so produced are useful in making electrodes and batteries.

32 Claims, 15 Drawing Sheets shows the XRD of the material so produced

U.S. PATENT DOCUMENTS

| | | |
|---|---|---|
| 6,716,372 B2 | 4/2004 | Barker et al. |
| 6,730,281 B2 | 5/2004 | Barker et al. |
| 2002/0195591 A1 | 12/2002 | Ravet et al. |
| 2004/0033360 A1 | 2/2004 | Armand et al. |
| 2004/0086445 A1 | 5/2004 | Armand et al. |
| 2004/0126300 A1 | 7/2004 | Barker et al. |
| 2004/0185344 A1 | 9/2004 | Barker et al. |
| 2005/0260494 A1* | 11/2005 | Huang et al. ............... 429/224 |

* cited by examiner

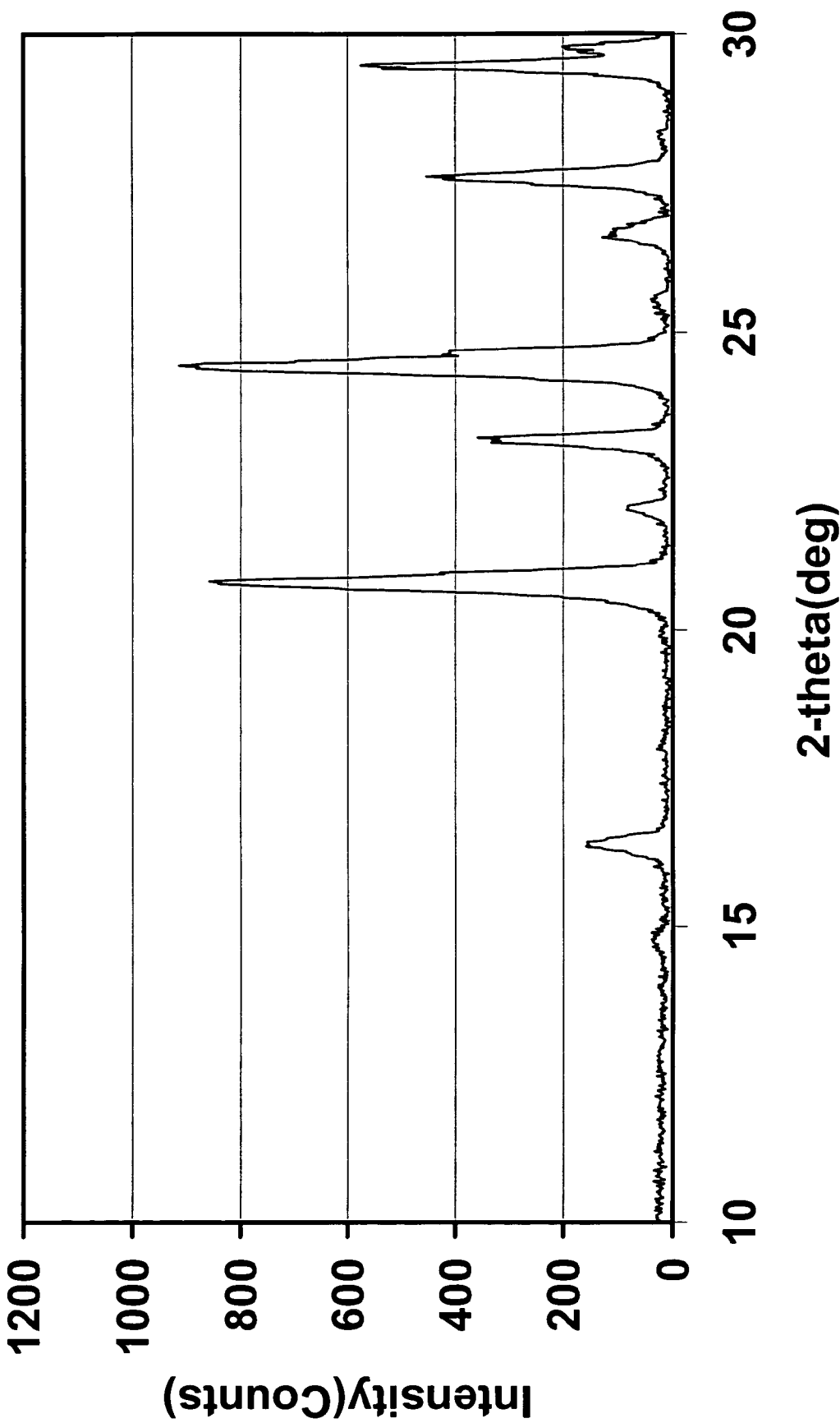
Figure 1 shows the XRD of the material so produced

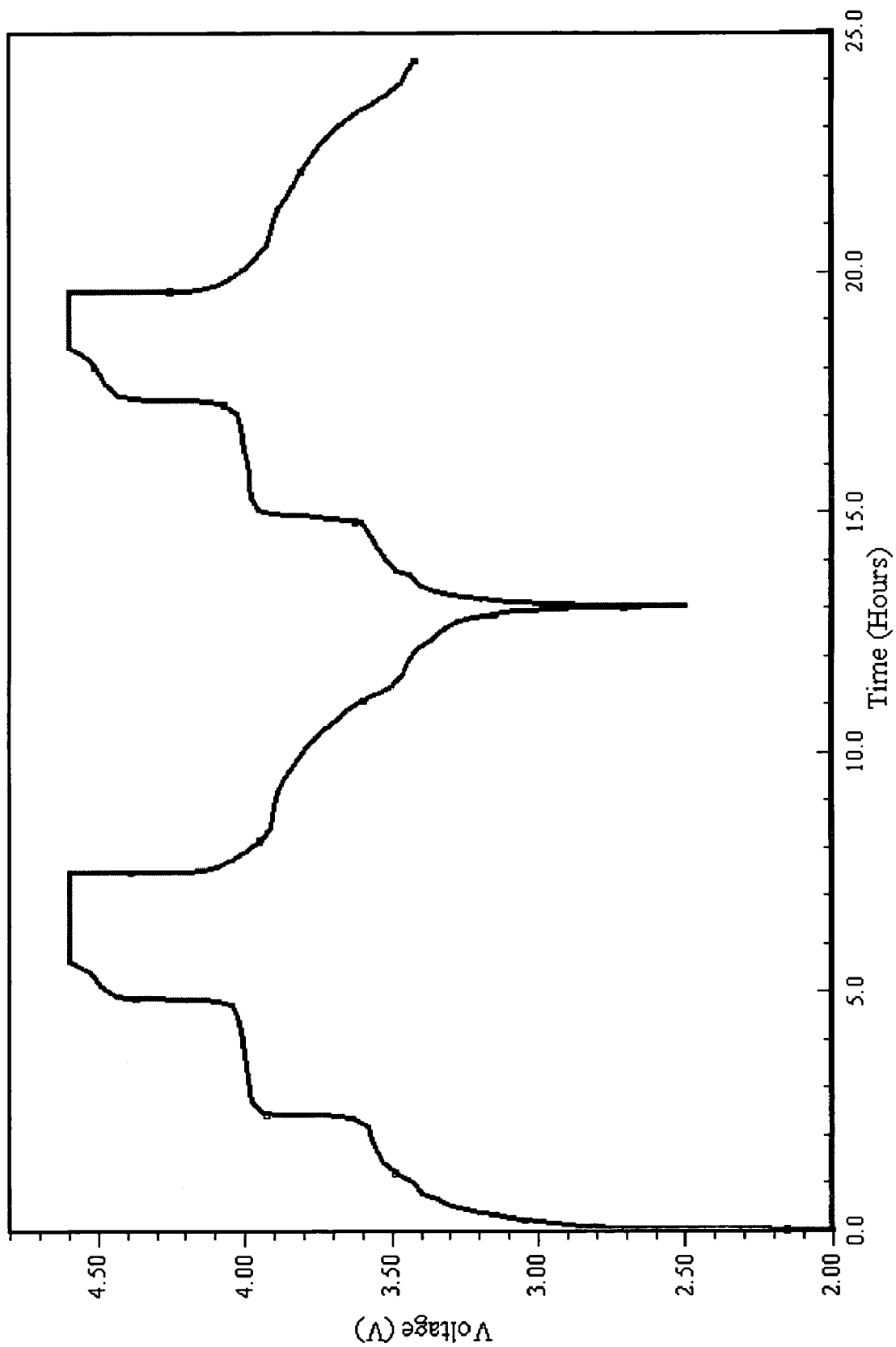

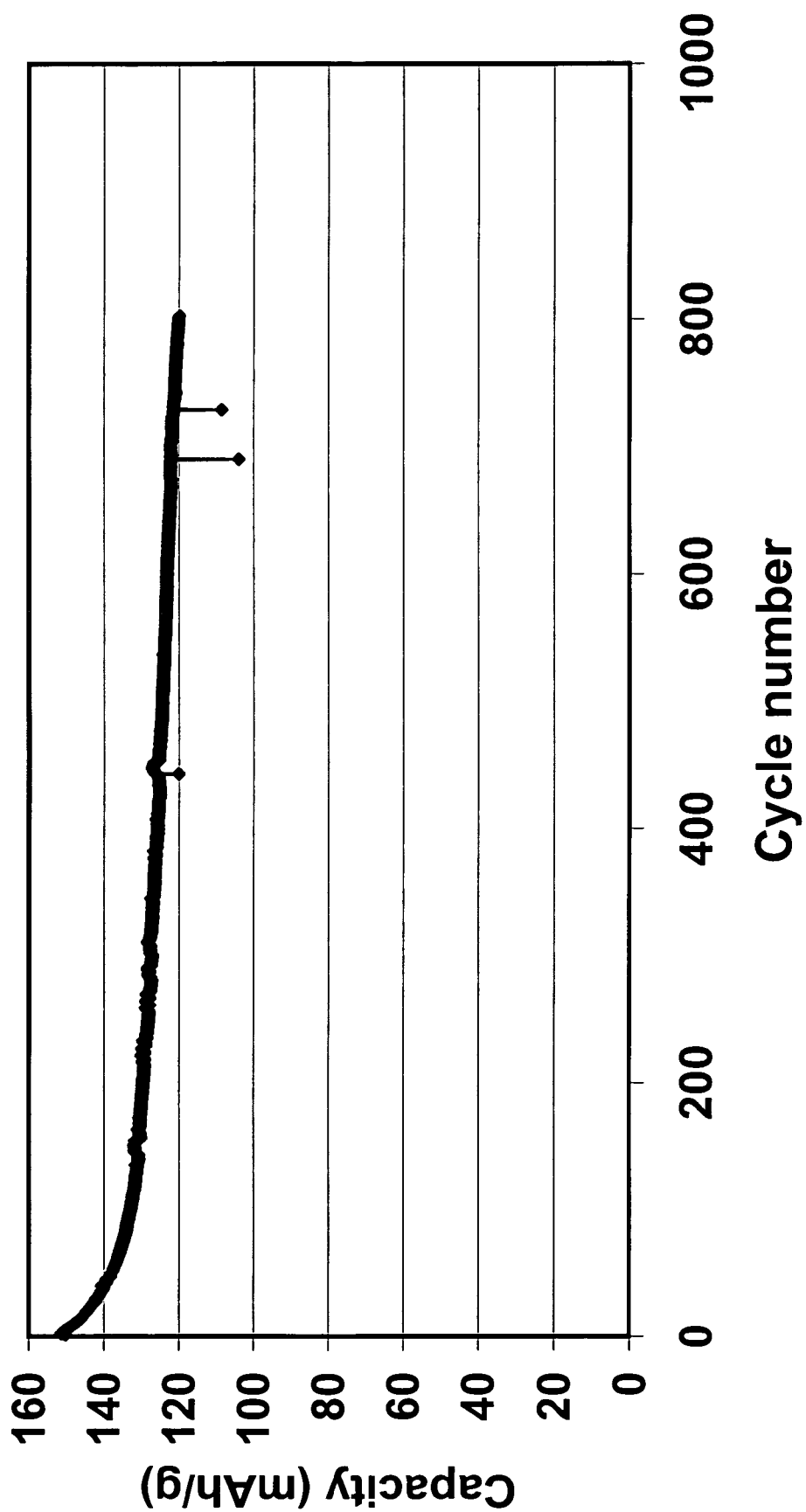

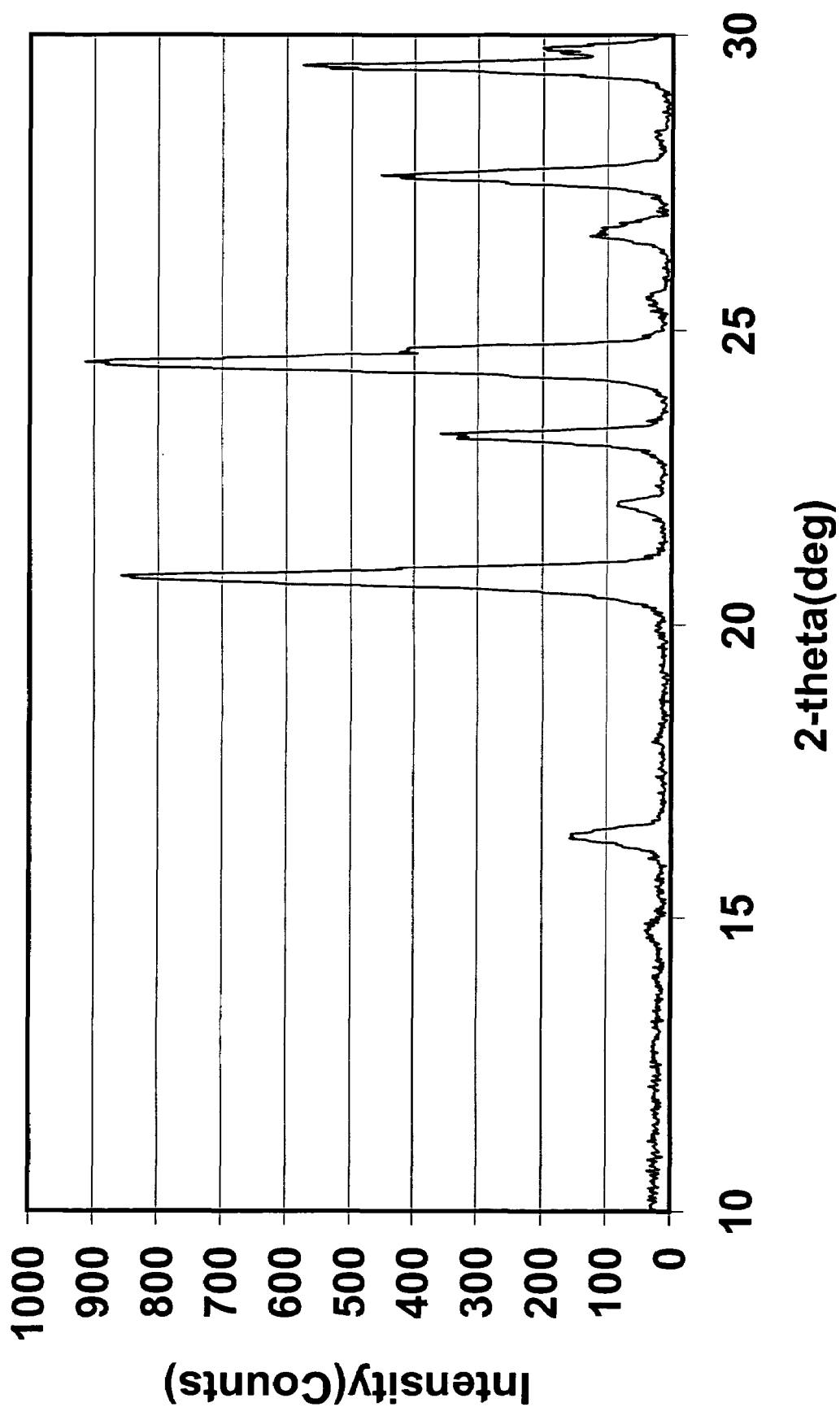

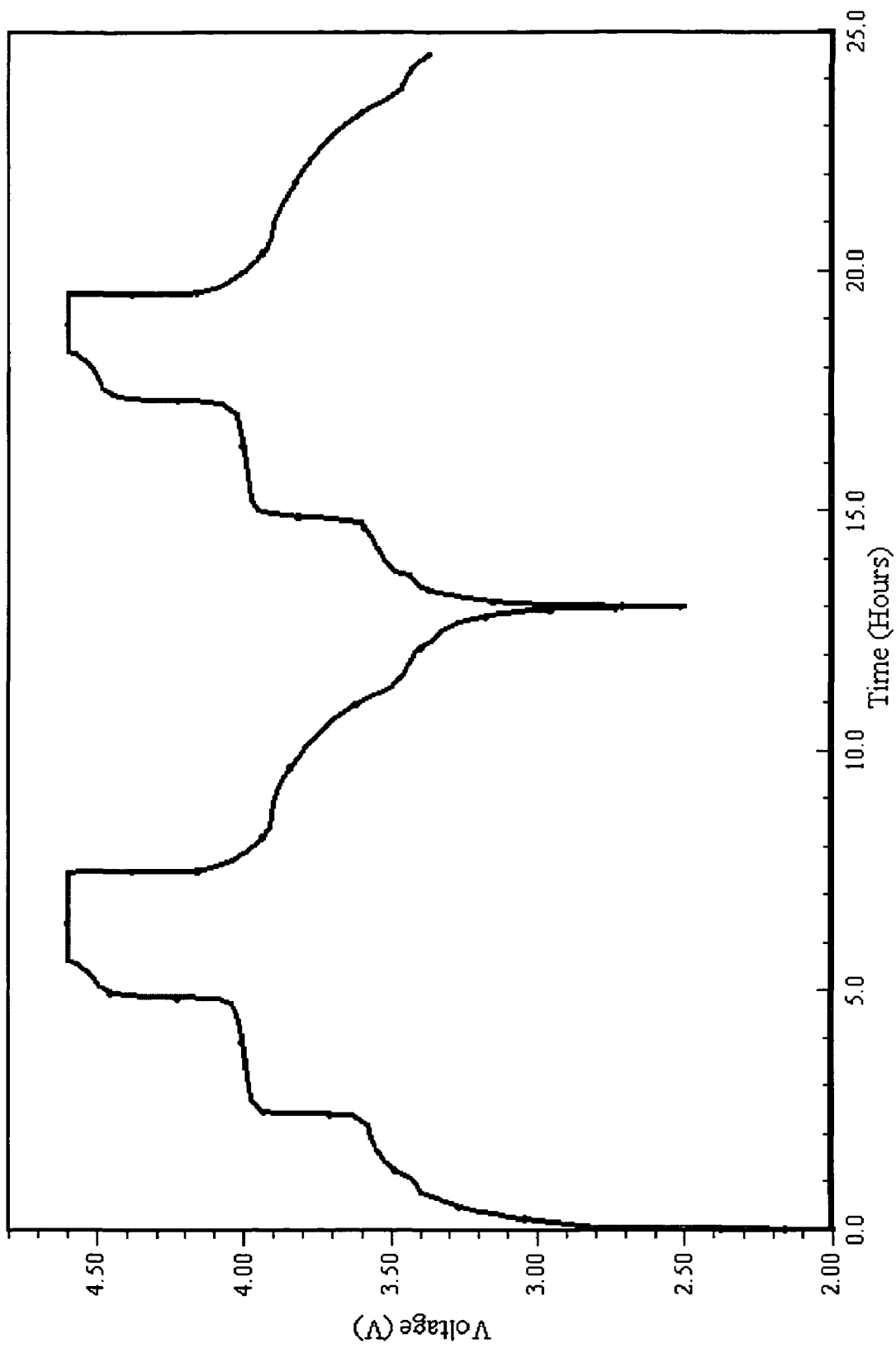

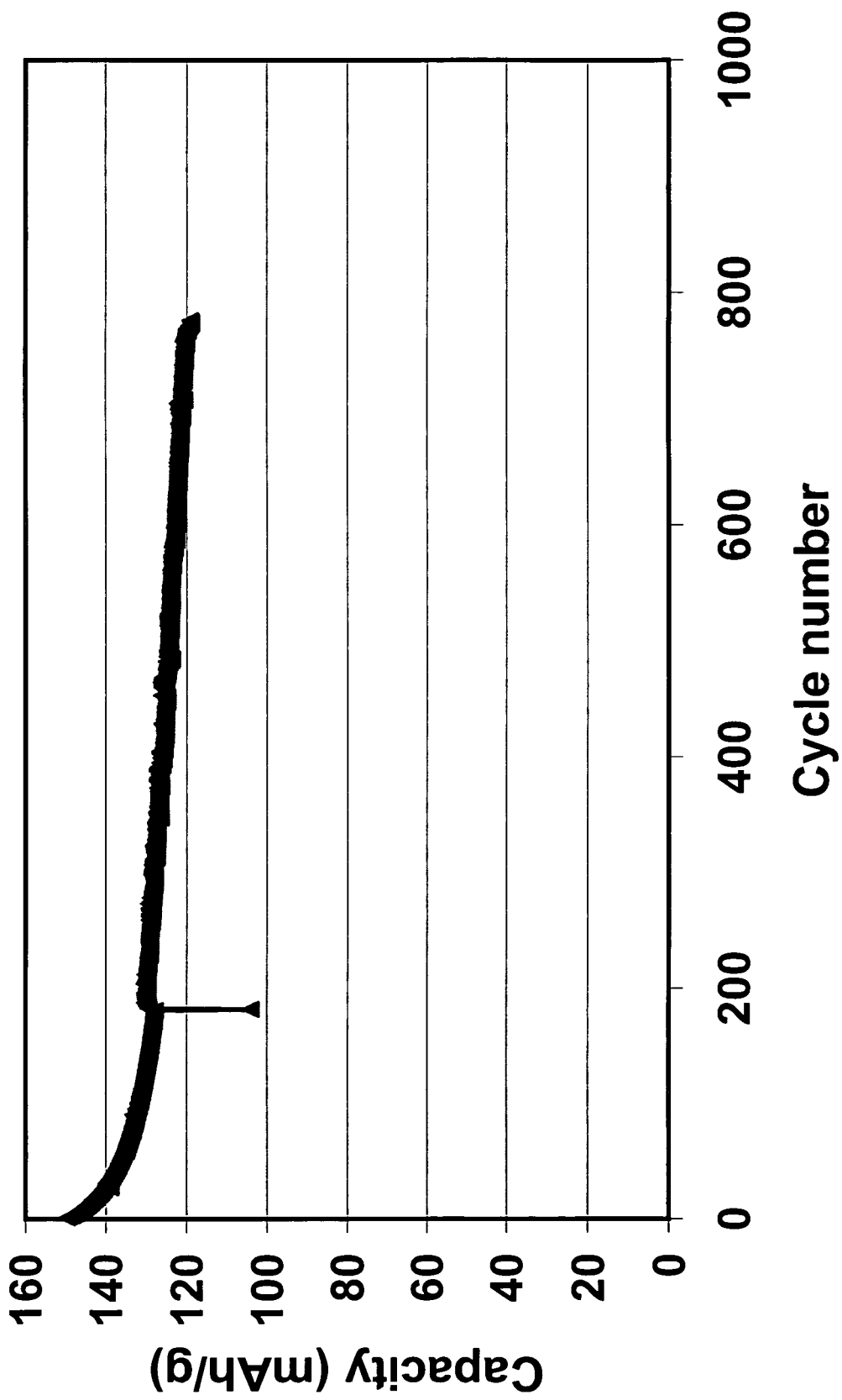

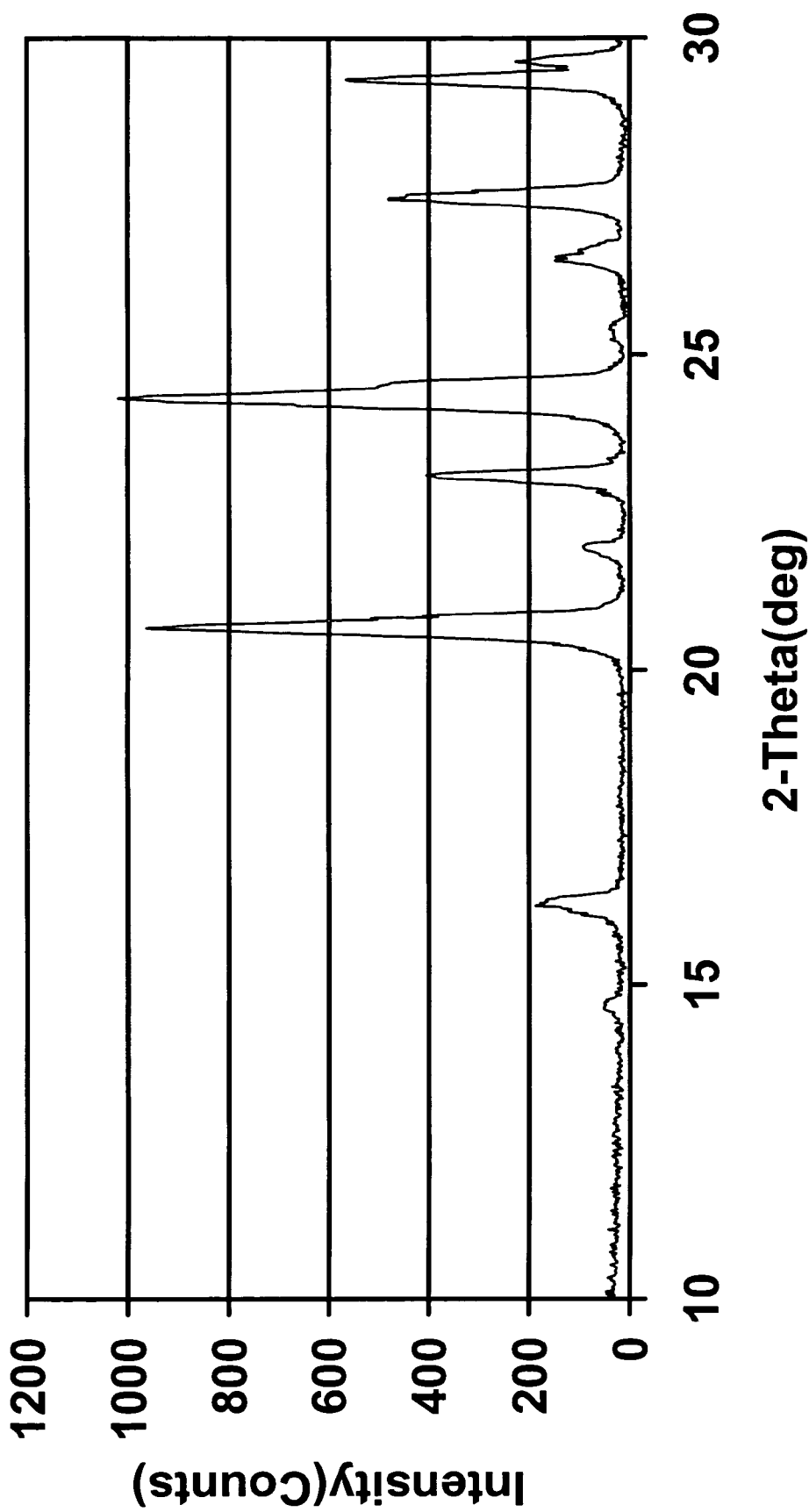
Figure 7 shows the XRD of the material so produced

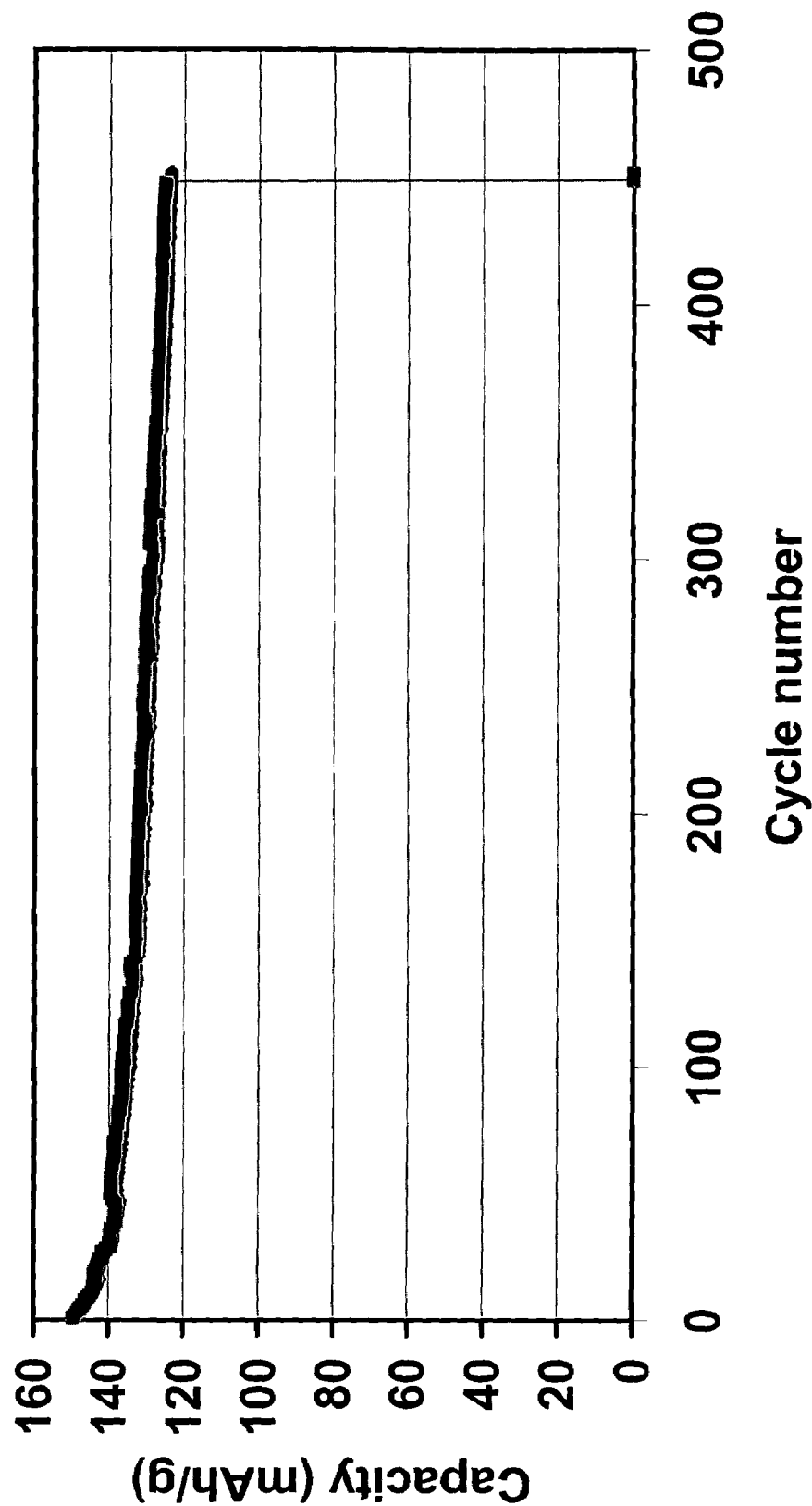
Figure 8 shows cycling behavior of the polymeric LVP at a current rate of C/2

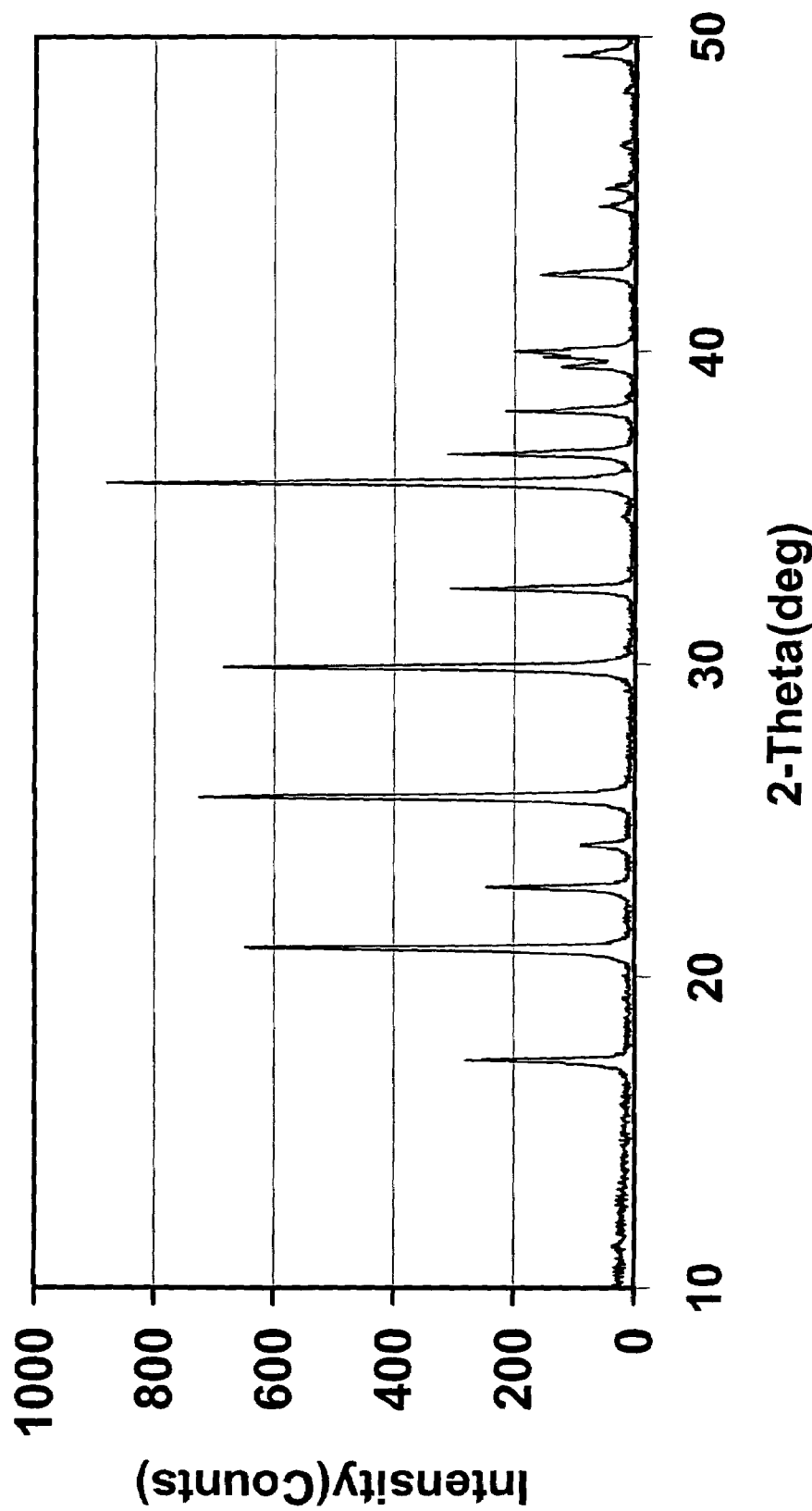
Figure 9 shows the XRD of the material so produced

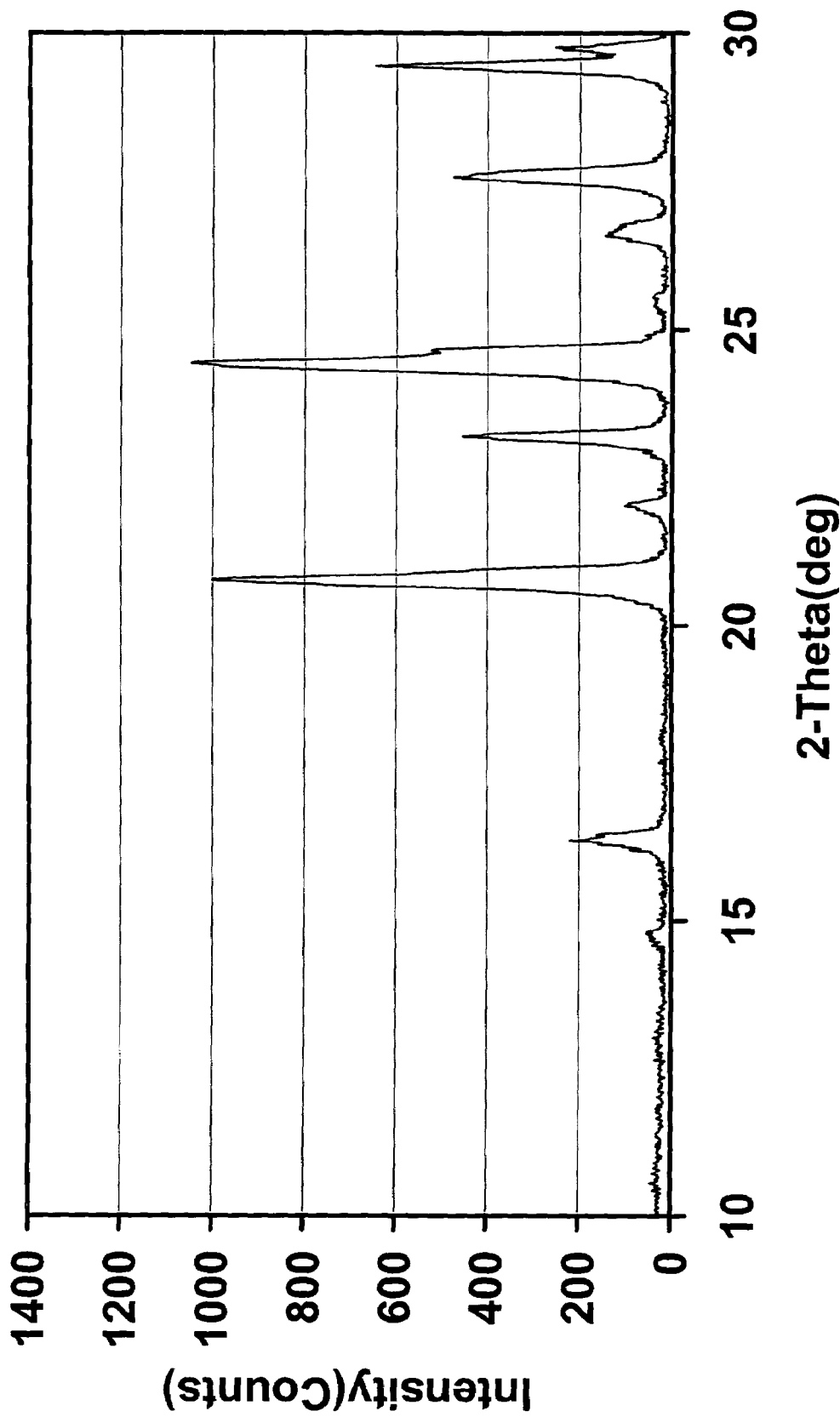

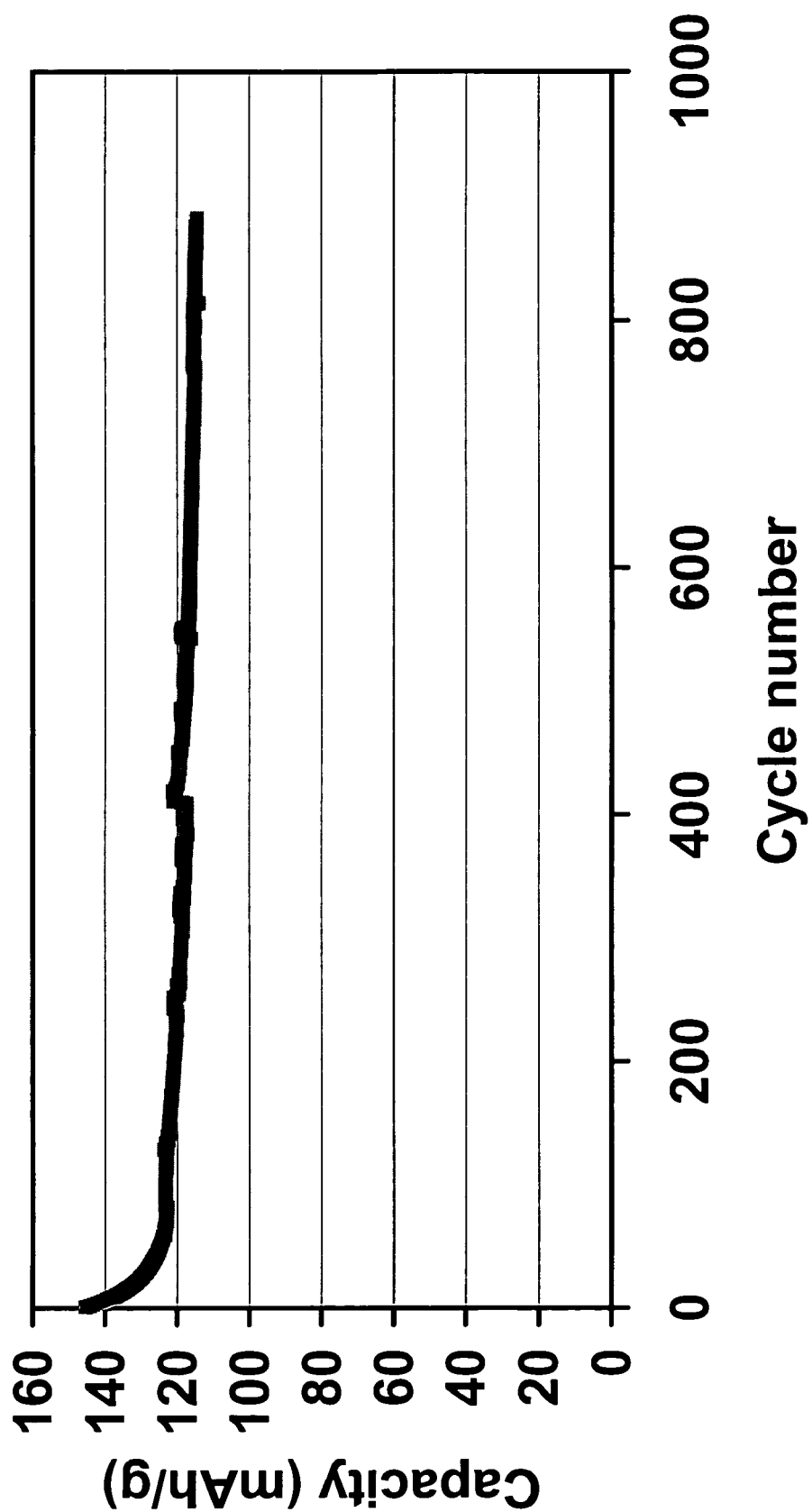

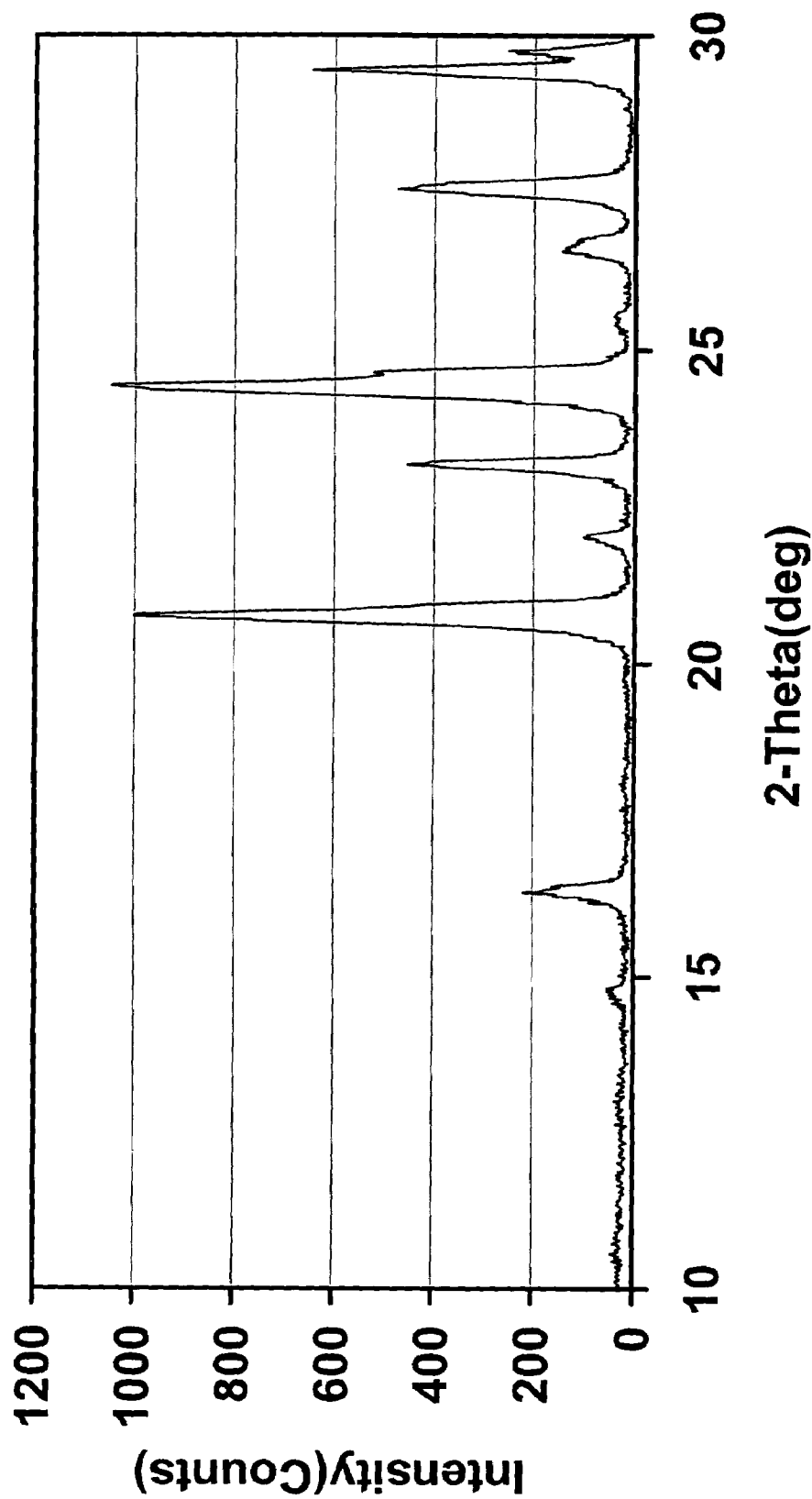
Figure 12 shows the XRD of the material so produced

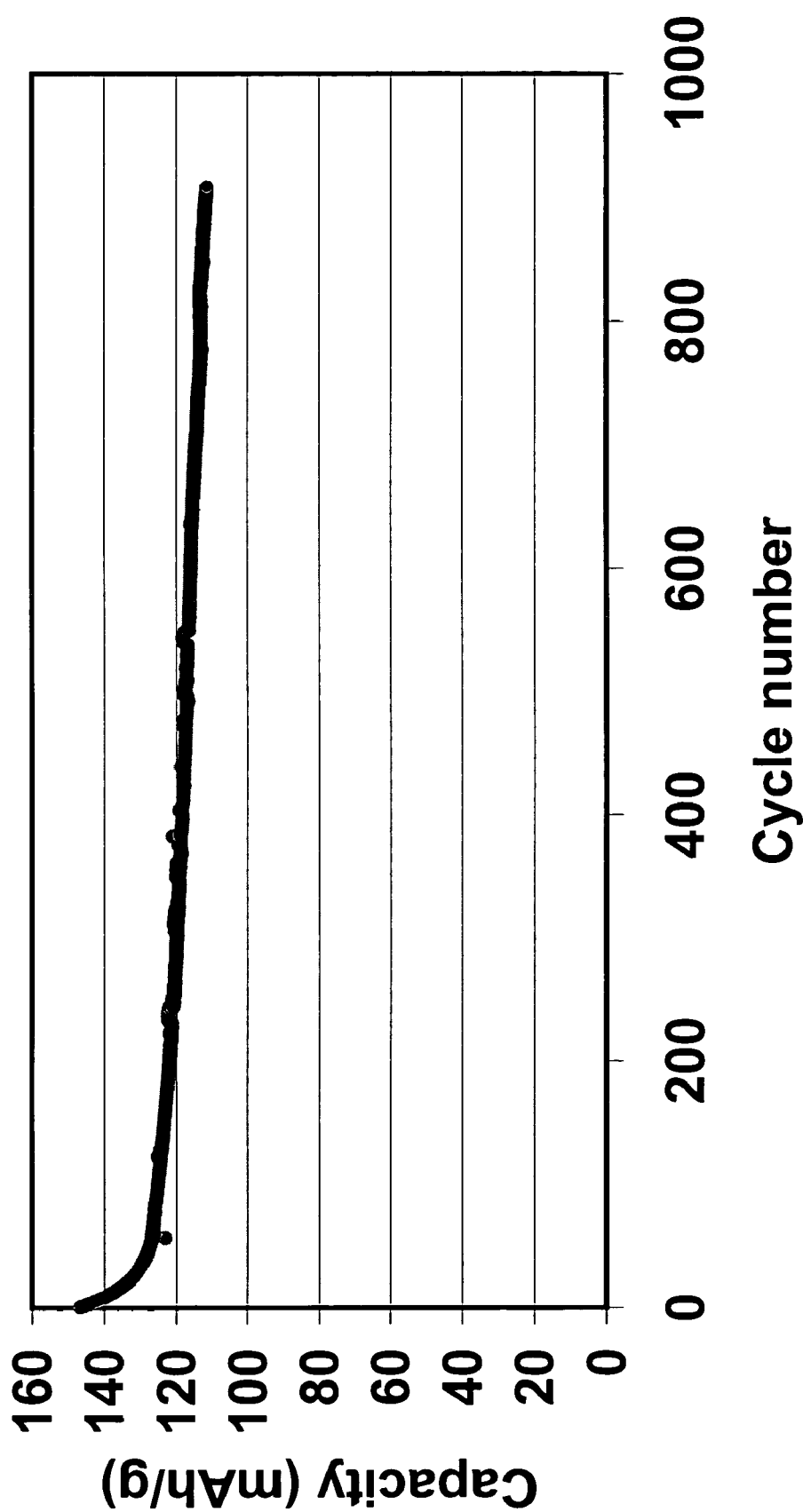

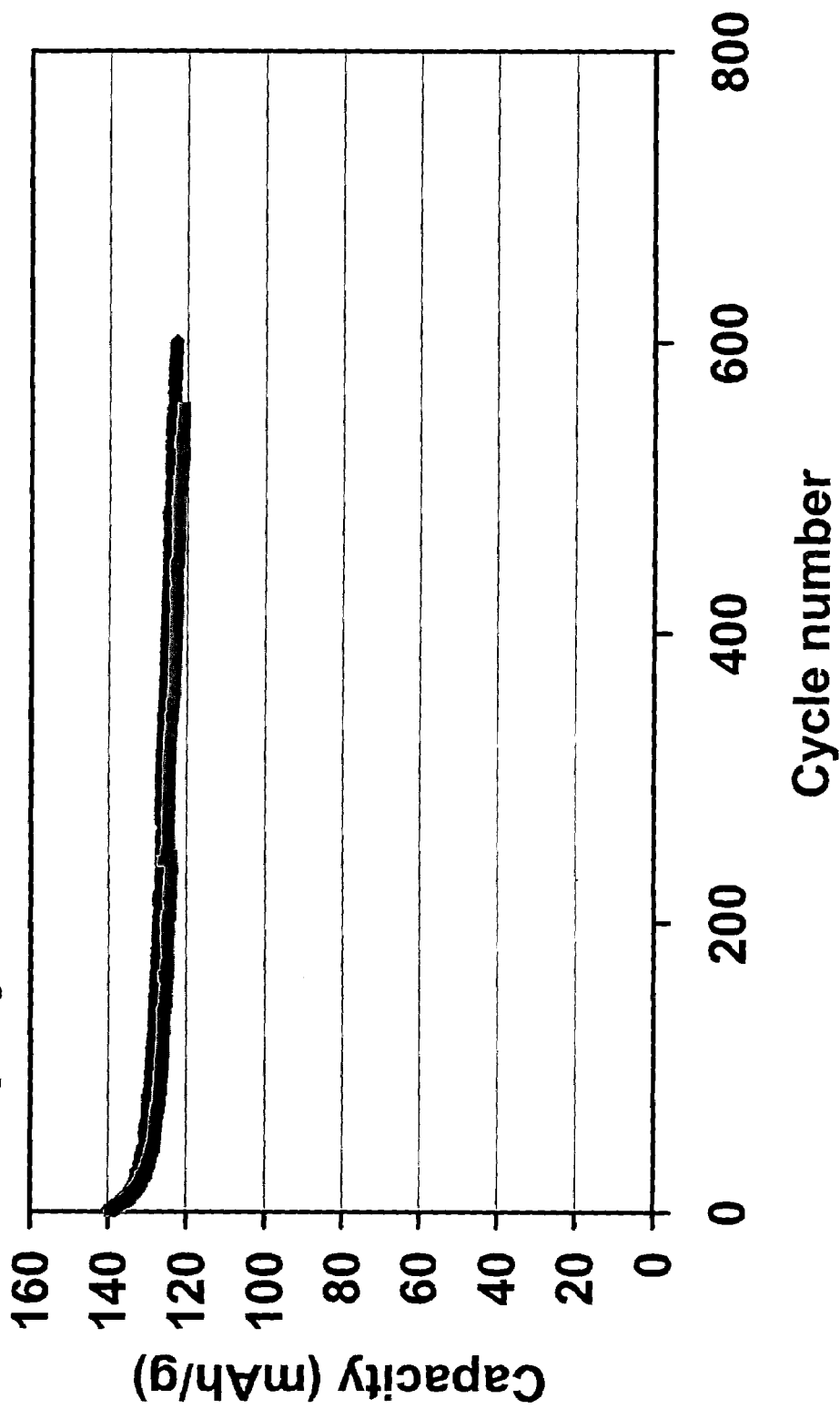

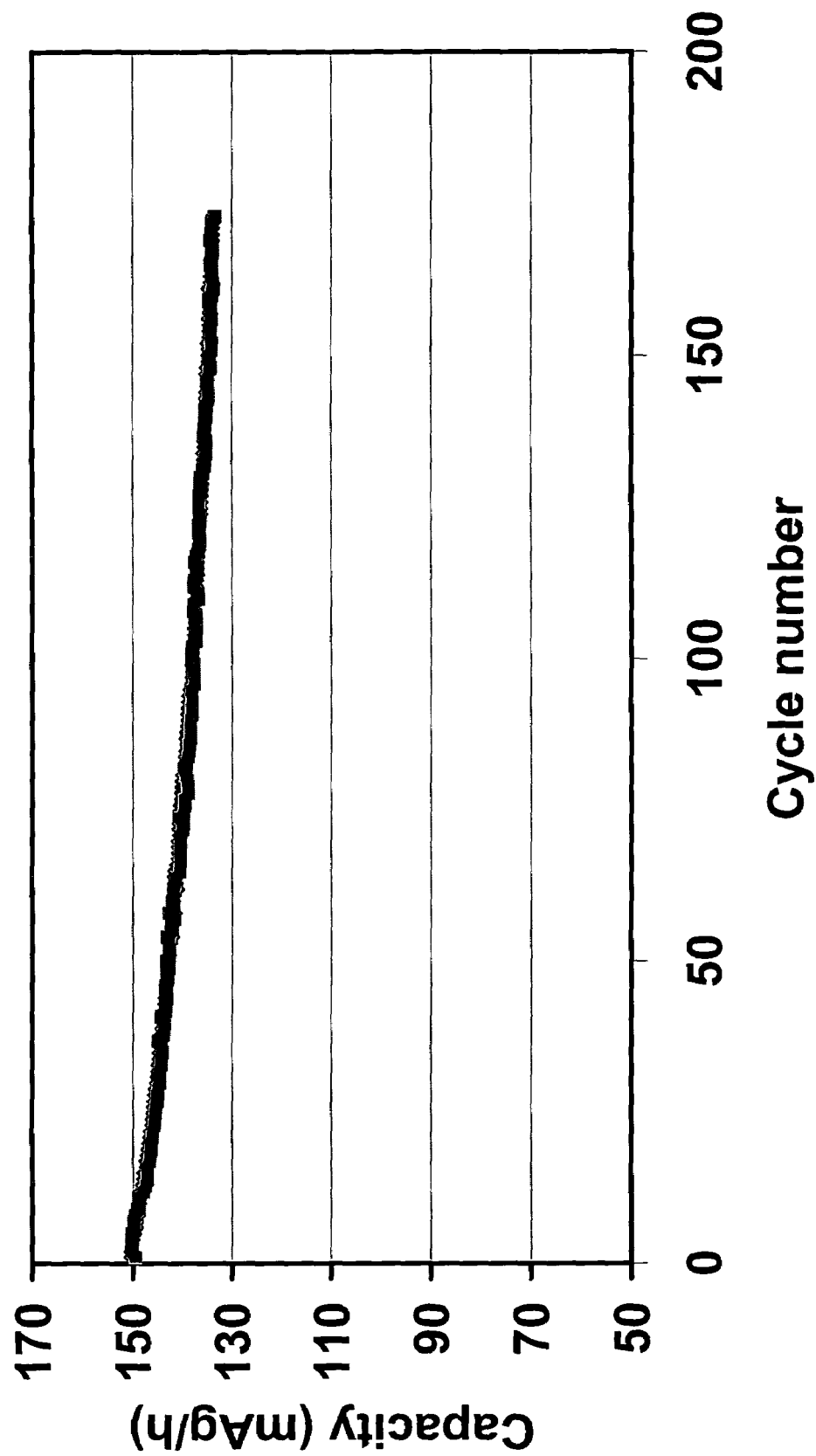

US 7,338,647 B2

SYNTHESIS OF CATHODE ACTIVE MATERIALS

FIELD OF THE INVENTION

The present invention relates to the synthesis of electroactive materials for use in batteries, more specifically to cathode active materials for use in lithium ion batteries.

BACKGROUND OF THE INVENTION

The proliferation of portable electronic devices such as cell phones and laptop computers has lead to an increased demand for high capacity, long endurance light weight batteries. Because of this alkali metal batteries, especially lithium ion batteries, have become a useful and desirable energy source. Lithium metal, sodium metal, and magnesium metal batteries are well known and desirable energy sources.

By way of example and generally speaking, lithium batteries are prepared from one or more lithium electrochemical cells containing electrochemically active (electroactive) materials. Such cells typically include, at least, a negative electrode, a positive electrode, and an electrolyte for facilitating movement of ionic charge carriers between the negative and positive electrode. As the cell is charged, lithium ions are transferred from the positive electrode to the electrolyte and, concurrently from the electrolyte to the negative electrode. During discharge, the lithium ions are transferred from the negative electrode to the electrolyte and, concurrently from the electrolyte back to the positive electrode. Thus with each charge/discharge cycle the lithium ions are transported between the electrodes. Such rechargeable batteries are called rechargeable lithium ion batteries or rocking chair batteries.

The electrodes of such batteries generally include an electrochemically active material having a crystal lattice structure or framework from which ions, such as lithium ions, can be extracted and subsequently reinserted and/or permit ions such as lithium ions to be inserted or intercalated and subsequently extracted. Recently, a class of transition metal phosphates and mixed metal phosphates have been developed, which have such a crystal lattice structure. These transition metal phosphates are insertion based compounds like their oxide based counterparts. The transition metal phosphates and mixed metal phosphates allow great flexibility in the design of lithium ion batteries.

Recently, three-dimensional structured compounds comprising polyanions such as $(SO_4)^{n-}$, $(PO_4)^{n-}$, $(AsO_4)^{n-}$, and the like, have been proposed as viable alternatives to oxide based electrode materials such as $LiM_xO_y$. A class of such materials is disclosed in U.S. Pat. No. 6,528,003 B1 (Barker et al.) The compounds therein are of the general formula $Li_aMI_bMII_c(PO_4)_d$ wherein MI and MII are the same or different. MI is a metal selected from the group consisting of Fe, Co, Ni, Mn, Cu, V, Sn, Ti, Cr and mixtures thereof. MII is optionally present, but when present is selected from the group consisting of Mg, Ca, Zn, Sr, Pb, Cd, Sn, Ba, Be, and mixtures thereof. More specific examples of such polyanion based materials include the olivine compounds such as $LiMPO_4$, wherein M=Mn, Fe, Co and the like. Other examples of such polyanion based materials include the NASICON compounds such as $Li_3M_2(PO_4)_3$, and the like.

Although these compounds find use as electrochemically active materials useful for producing electrodes these materials are not always economical to produce, they may afford insufficient voltage, have insufficient charge capacity or exhibit low ionic conductivity. The present invention provides an economical, reproducible and efficient method for producing metal phosphates and mixed metal phosphates with good electrochemical properties which make them useful for producing electrodes and in particular cathodes.

SUMMARY OF THE INVENTION

The present invention relates to a method for preparing an electroactive metal polyanion or a mixed metal polyanion comprising forming a slurry comprising a polymeric material, a solvent, a polyanion source or alkali metal polyanion source and at least one metal ion source; heating said slurry at a temperature and for a time sufficient to remove the solvent and form an essentially dried mixture; and heating said mixture at a temperature and for a time sufficient to produce an electroactive metal polyanion or electroactive mixed metal polyanion. In a preferred embodiment the present invention relates to a method for preparing a metal polyanion or a mixed metal polyanion which comprises dissolving a polymeric material in a solvent to form a first solution, adding a polyanion source or alternatively an alkali metal polyanion source to the first solution while stirring to form a first slurry, adding a source of at least one metal ion to said first slurry while stirring to form a second slurry, heating said second slurry at a temperature and for a time sufficient to remove the solvent to form an essentially dried mixture, then heating said mixture at a temperature and for a time sufficient to produce an electroactive metal polyanion or an electroactive mixed metal polyanion. In an alternative embodiment the present invention relates to a method for preparing a metal polyanion or a mixed metal polyanion which comprises mixing a polymeric material with a polyanion source or alternatively an alkali metal polyanion source and a source of at least one metal ion to produce a fine mixture and heating the mixture to a temperature higher than the melting point of the polymeric material, milling the resulting material and then heating the milled material. It is another object of the invention to provide electrochemically active materials produced by said methods. The electrochemically active materials so produced are useful in making electrodes and batteries.

BRIEF DESCRIPTION OF THE DRAWINGS

FIG. 1 shows the XRD of the material produced in Example 1.

FIG. 2 shows the voltage vs. time profile of the polymeric LVP produced according to Example 1.

FIG. 3 shows the cycling behavior and voltage profile of the polymeric LVP produced according to Example 1 at C/2.

FIG. 4 shows the XRD of the material produced according to Example 2.

FIG. 5 shows the voltage vs. time profile of the polymeric LVP produced according to Example 2.

FIG. 6 shows the cycling behavior and voltage profile of the polymeric LVP produced according to Example 2 at C/2.

FIG. 7 shows the XRD of the material produced according to Example 3.

FIG. 8 shows the cycling behavior of the polymeric LVP produced according to Example 3 at a current rate of C/2.

FIG. 9 shows the XRD of the material produced according to Example 4.

FIG. 10 shows the XRD of the material produced according to Example 5.

FIG. 11 shows the cycling behavior of the material produced according to Example 5 at a current rate of C/2.

FIG. 12 shows the XRD of the material produced according to Example 6

FIG. 13 shows the cycling behavior of the material produced according to Example 6 at a current rate of C/2.

FIG. 14 shows the cycling behavior of the polymeric LVP produced according to Example 7 at a current rate of C/2.

FIG. 15 shows the cycling behavior of the polymeric LVP produced according to Example 8 at a current rate of C/2.

DETAILED DESCRIPTION

The present invention relates to methods for preparing electroactive metal polyanions and mixed metal polyanions and in particular to methods for preparing metal phosphates and mixed metal phosphates. In another embodiment the present invention relates to electrochemically active materials produced by such methods, electrodes produced from such electroactive materials and batteries which contain such electrodes.

Metal phosphates, and mixed metal phosphates and in particular lithiated metal and mixed metal phosphates have recently been introduced as electrode active materials for ion batteries and in particular lithium ion batteries. These metal phosphates and mixed metal phosphates are insertion based compounds. What is meant by insertion is that such materials have a crystal lattice structure or framework from which ions, and in particular lithium ions, can be extracted and subsequently reinserted and/or permit ions to be inserted and subsequently extracted.

The transition metal phosphates allow for great flexibility in the design of batteries, especially lithium ion batteries. Simply by changing the identity of the transition metal allows for regulation of voltage and specific capacity of the active materials. Examples of such transition metal phosphate cathode materials include such compounds of the nominal general formulae $LiFePO_4$, $Li_3V_2(PO_4)_3$ and $LiFe_{1-x}Mg_xPO_4$ as disclosed in U.S. Pat. No. 6,528,033 B1 (Barker et al, hereinafter referred to as the '033 patent) issued Mar. 4, 2003.

A class of compounds having the general formula $Li_a MI_b MII_c (PO_4)_d$ wherein MI and MII are the same or different are disclosed in U.S. Pat. No. 6,528,003 B1 (Barker et al.). MI is a metal selected from the group consisting of Fe, Co, Ni, Mn, Cu, V, Sn, Ti, Pb, Si, Cr and mixtures thereof. MII is optionally present, but when present is selected from the group consisting of Mg, Ca, Zn, Sr, Pb, Cd, Sn, Ba, Be, and mixtures thereof. It is disclosed therein, for example, that $LiFePO_4$ can be prepared by mixing the reactants $Fe_2O_3$, $Li_2CO_3$, $(NH_4)_2HPO_4$ and carbon and heating said mixture in an inert atmosphere. The carbon is present in an amount sufficient to reduce the oxidation state of at least one metal ion of the starting materials without full reduction to the elemental state. This process is beneficial in that it employs the relatively inexpensive material $Fe_2O_3$. Previous methods for preparing $LiFePO_4$ required the use of the more expensive $Fe^{2+}$ salts, such as oxalate, acetate or FeO.

U.S. Pat. No. 6,528,033 B1 also discloses that $LiFe_{1-x}Mg_xPO_4$ can be prepared using $Fe_2O_3$. $LiFe_{1-x}Mg_xPO_4$ is prepared by mixing the reactants $LiH_2PO_4$, $Fe_2O_3$, $Mg(OH)_2$ and carbon and heating said reaction mixture in an inert atmosphere. The carbon again is present in an amount sufficient to reduce the oxidation state of at least one metal ion of the starting materials without full reduction to the elemental state. This process is also economical in that it employs $Fe_2O_3$ instead of the more expensive $Fe^{2+}$ salts.

It is also disclosed in U.S. Pat. No. 6,528,033 B1 that $Li_3V_2(PO_4)_3$ (lithium vanadium phosphate) can be prepared by ball milling $V_2O_5$, $Li_2CO_3$, $(NH_4)_2HPO_4$ and carbon, and then pelletizing the resulting powder. The pellet is then heated to 300° C. to remove $CO_2$ from the $LiCO_3$ and to remove the $NH_2$. The pellet is then powderized and repelletized. The new pellet is then heated at 850° C. for 8 hours to produce the desired electrochemically active product.

It has been found that when making lithium vanadium phosphate by the method of the '033 patent that problems result from the dry ball mixing method. The dry ball-mill mixing method on a larger production scale sometimes results in an incomplete reaction of the starting materials. When the incomplete reaction occurs and the product so produced is used in a cell it produces a cell with poor cycle performance. The method on a large scale also resulted in poor reproducibility of the product formed.

Additionally, it has been found that when lithium vanadium phosphate and $LiFe_{1-x}Mg_xPO_4$ prepared using the methods of the '033 patent on a larger scale are used in the preparation of phosphate cathodes it results in phosphate cathodes with high resistivity. The lithium vanadium phosphate and $LiFe_{1-x}Mg_xPO_4$ powders produced by the method of the '033 patent on a large scale also exhibit a low tap density.

It has now surprisingly been found these classes of compounds, and compounds similar to those disclosed in U.S. Pat. No. 6,528,033 B1 can be prepared in a beneficial manner to produce materials with high electronic conductivity and an excellent cycle life with superior reversible capacity. The methods of the present invention employ a polymeric material which is capable of forming a solution with the solvent and acts a phase separation inhibitor in either a wet mix or dry mix method. The polymeric material also acts to form a conductive network throughout the metal polyanions and mixed metal polyanions produced by the process of the present invention. It has now also been found that materials so produced exhibit good electronic conductivity when used as the active materials in electrodes, and preferably in cathodes.

In one embodiment of the invention a metal polyanion or mixed metal polyanion is produced by a wet mix method. The process comprises forming a mixture comprising a solvent having a boiling point, together with a polymeric material, a polyanion source and a source of at least one metal ion and heating the mixture so formed at a temperature greater than the boiling point of the solvent for a period of time sufficient to remove substantially all the solvent to produce an essentially dry mixture, and heating the dried mixture so obtained to produce an electroactive metal polyanion or an electroactive mixed metal polyanion. The polyanion source and polymeric material are preferably capable of forming a solution in the solvent without substantial phase separation with the solvent.

In a preferred embodiment the present invention relates to a method for preparing a metal polyanion or a mixed metal polyanion which comprises dissolving a polymeric material in a solvent to form a first solution, adding a polyanion source or alternatively an alkali metal polyanion source to the first solution while stirring to form a first slurry, adding a source of at least one metal ion to said first slurry while stirring to form a second slurry, heating said second slurry at a temperature and for a time sufficient to form an essentially dried mixture, then heating said mixture at a temperature and for a time sufficient to produce an electroactive metal polyanion or an electroactive mixed metal polyanion.

By way of further example, the first step of a preferred process comprises dissolving a polymeric material, in a solvent to form a first solution. The solvent can be any volatile solvent that can dissolve the polymeric material. Preferably, the solvent is a volatile solvent having a boiling point of less than about 300° C., preferably less than 200° C. and more preferably less than 120° C. In a preferred embodiment the solvent is water. A polyanion source (or an alkali metal polyanion source) is added to the first solution while stirring to form a first slurry. A source of at least one metal ion is then added to the first slurry to form a second slurry. Said second slurry is then heated at a temperature greater than the boiling point of the solvent to produce an essentially dried mixture. The dried mixture is then ball milled and heated to produce a metal phosphate or mixed metal phosphate material with high electronic conductivity.

It is understood and one skilled in the art would recognize that although the preferred embodiment described above, states the order in which the polymeric material, the polyanion source and the metal ion are added to form the slurry that the polymeric material, the polyanion source and the metal ion can be added to the solvent in any order. For example, the polyanion source and the metal ion source can be added to the solvent and then the polymeric material can be added. Alternatively, the metal ion source can be added to the solvent, then the polymeric material and then the polyanion source. The polymer can be added to the solvent first, then the metal ion source added and then the polyanion source can be added in an alternative embodiment.

In the preferred embodiment the polymeric material is added first since the polymeric material is soluble in the solvent it is easy to discern when the polymeric material is dissolved. The polyanion source, preferably a phosphate source, is then added in the preferred embodiment. The phosphate source is also soluble in the solvent and therefore it can be readily determined when the phosphate source is dissolved. The metal ion is added last in that the metal ion does not dissolve in the solvent and may color the solution, as in the case of $V_2O_3$ the solution turns black.

In a preferred embodiment of the present invention an amount of polymeric material is dissolved in water to form a first solution. The alkali metal polyanion, lithium hydrogen phosphate (LHP) is added to the first solution while stirring to form a first slurry. A source of metal ion is added to the first slurry while stirring to produce a second slurry. The second slurry is then dried for 24 hours at a temperature greater than the boiling point of the solvent. The resulting dried powder is then pelletized and fired in a tube furnace.

Without being limited hereby, it is believed that the polymeric material acts as a phase separation inhibitor during drying, heating and firing. In addition when used as such the polymeric material acts as an electron conductivity promoter in the final products. The polymeric material additionally serves as a mix aid during the process by holding the reactants tightly together which produces a highly condensed products that have a higher tap density than materials made by the method of the '033 patent.

By way of example, in the preparation of lithium vanadium phosphate, using the method of the present invention, (outlined above and more fully described in detail in the Examples) the preferred polymeric material, either polyethylene glycol (PEG) or polyethylene oxide (PEO) is dissolved in water with stirring. PEG and PEO are soluble in the solvent, water. The preferred polyanion source, lithium hydrogen phosphate (LHP) is then added to the solvent, water, containing the dissolved polymeric material while stirring to form a first slurry. The polyanion source LHP is also soluble in the solvent, water. Then the metal ion source ($V_2O_3$) is added to the first slurry with stirring to form a second slurry. During drying, heating and firing, the polymeric material serves as a "holder" by holding the LHP on the surface of the $V_2O_3$. In doing this, the reaction between the LHP and $V_2O_3$ can be more efficient and go further to completion without phase separation occurring among the reactants. During the processing the polymeric material melts and changes substance form from liquid, to gel, to solid and forms a conductive network throughout the electroactive materials produced.

In an alternate embodiment, a source of carbon can be added to the reaction mixture. The carbon can be added to the first or second slurry or can be added to the essentially dried mixture before heating. If the carbon is added to the essentially dried mixture the mixture and the carbon are ball milled or mixed by another means to produce a uniform mixture prior to heating The carbon used can be an elemental carbon, preferably in particulate form such as graphites, amorphous carbon, carbon blacks and the like. In another aspect the carbon can be provided by an organic precursor material, or by a mixture of elemental carbon and an organic precursor material. By organic precursor material is meant a material made up of carbon and hydrogen, containing no significant amounts of other elements and that is capable of forming a decomposition product that contains carbon. Examples of such organic precursor materials include, but are not limited to, coke, organic hydrocarbons, alcohols, esters, ketones, aldhydes, carboxylic acids, sulfonates, ethers, sugars, other carbohydrates, polymers and the like. The carbon or organic precursor material is added in an amount from about 0.1 weight percent to about 30 weight percent, preferably from about 1 weight percent to about 12 weight percent and more preferably from about 6 weight percent to about 12 weight percent.

The carbon remaining in the reaction product functions as a conductive constituent in the ultimate electrode or cathode formulation. This is an advantage since such remaining carbon is very intimately mixed with the reaction product material.

In a preferred embodiment of the invention the solvent used is water and in particular deionized water. However it would be apparent to one skilled in the art that any organic solvent would be useful herein when the polymeric material is soluble therein and as long as the solvent does not interact with the polymeric material or the polyanion source to adversely affect the desired product of the final product. Such solvents are preferably volatile and include, but are not limited to, deionized water, water, dimethylsulfoxide (DMSO), N-methylpyrrolidinone (NMP), propylene carbonate (PC), ethylene carbonate (EC), dimethylformamide (DMF), dimethyl ether (DME), tetrahydrofuran (THF), butyrolactone (BL) and the like. Preferably the solvent should have a boiling point in the range from about 25° C. to about 300° C.

The polymeric material as used in the present process acts as a "conductive network former". The process of the present invention produces an admixture of the polymeric material with the metal polyanion or mixed metal polyanion, followed by heating wherein the polymeric material upon heating forms an electron conductive network within the final metal polyanion product or within the final mixed metal polyanion product.

The polymeric material is an organic substance preferably composed of carbon, oxygen and hydrogen, with amounts of other elements in quantity low enough to avoid interference with the synthesis of the metal polyanion or mixed metal polyanion and to avoid interference with the operation of the metal polyanion or mixed metal polyanion when used in a cathode. The presence and effectiveness of the conductive network can be detected using powder resistivity measurements. Such measurements, in general, have indicated a high resistivity for lithium metal phosphates produced by the method of the '033 patent and a more desirable low resistivity for the lithium metal phosphates produced by the process of the present invention.

Powder resistivity measures the resistivity of composite materials in powder form. In the case of composite materials that are comprised primarily of insulating powders with small amounts of conductive materials, the resistivity of the composite will be governed by the amount of conductive material present and its pattern of distribution throughout the composite. In theory, without being limited thereby, it is believed that the optimal distribution of conductive material, for reducing the resistivity of a composite material is a network, wherein the conductive material forms continuous current paths or series of current paths throughout the composite material. In theory, without being limited thereby, the polymeric material as used in the process of the present invention, upon heating produces such current paths to form a conductive network throughout the metal polyanions and mixed metal polyanions. With such a conductive network current can flow throughout the composite materials and resistivity of the composite is minimized.

The polymer is chosen so that it is soluble in the volatile solvent to be used in the process of the present invention. The polymer can be in liquid or solid form. If the polymer is in solid form it cannot have a melting point greater than the temperature at which the second heating step occurs. It follows that a polymer with too high of a melting point is generally less soluble than polymers with lower melting points and therefore may not be uniformly distributed throughout the reaction product. The polymeric material is added in an amount from about 1 weight percent to about 55 weight percent, and preferably in an amount from about 3 weight percent to about 12 weight percent and more preferably in an amount from about 6 weight percent to about 12 weight percent.

In a preferred embodiment of the invention the polymeric material is poly(oxyalkylene) ether and more preferably is polyethylene oxide (PEO) or polyethylene glycol (PEG) or mixtures thereof. However, it would be apparent to one with skill in the art that other polymeric materials would be useful in the methods of the present invention. Polymers containing predominantly or entirely carbon and hydrogen in the polymer chain are preferred. For example the polymeric material may include without limitation, carboxy methyl cellulose (CMC), ethyl hydroxyl ethyl cellulose (EHEC), polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose, starch and esters and ethers of those described above.

Preferably the polymeric material is compatible with the operation of the metal polyanion or mixed metal polyanion when used as a cathode active material in a cell. It is therefore preferred that residual amounts of the polymeric material will not interfere with the operation of the cell. Preferred polymers include polyethylene oxide, polyethylene, polyethylene glycol, carboxymethyl cellulose, ethyl hydroxyl ethyl cellulose and polypropylene. Polyethylene oxide is one preferred polymerin view of its known use as an electrolyte in lithium polymer batteries.

Preferably the polymeric material is added during synthesis in order to reduce the number of steps involved in preparing the electroactive materials. However, the polymeric material may be added to the metal polyanion or mixed metal polyanion during or after synthesis of the metal polyanion or mixed metal polyanion. In a preferred embodiment the polymeric material should be compatible with the starting materials used to form the metal polyanion or mixed metal polyanion. In a particularly preferred embodiment the polymeric material should be miscible with molten lithium dihydrogen phosphate. In this manner polyethylene oxide is again a preferred polymer because of its hydrophilic nature.

Polyanion sources include, but are not limited to, polyanion-containing compounds wherein the polyanion containing compound is selected from the group consisting of a $PO_4$-containing compound, a $SiO_4$ containing compound, a $GeO_4$-containing compound, a $VO_4$-containing compound, an $AsO_4$-containing compound, a $SbO_4$-containing compound, and a $SO_4$-containing compound. Preferably the polyanion-containing compound is a $PO_4$-containing compound. More preferably the $PO_4$-containing compound is selected from the group consisting of diammonium hydrogen phosphate, ammonium dihydrogen phosphate, lithium dihydrogen phosphate and mixtures thereof. Representative alkali metal polyanions include, but are not limited to $LiH_2PO_4$ and $NaH_2PO_4$, and the like. Sources containing both an alkali metal and a polyanion can serve as both an alkali metal source and a polyanion source.

Sources of metal ions include compounds containing a metal ion of a metal selected from the group consisting of Ti, V, Cr, Mn, Fe, Co, Ni, Cu, Mo, Si, Sn, Pb, Be, Mg, Ca, Sr, Ba, Zn, Cd, Ge, Sc, Y, B, Al, Ga, In and mixtures thereof. Examples of such metal ion sources include, but are not limited to $Fe_2O_3$, $Co_3O_4$, $Mn_2O_3$, $Fe_3O_4$, FeO, CoO, $MnO_2$, MnO, magnesium hydroxide, magnesium carbonate, magnesium acetate, magnesium oxide, calcium hydroxide, calcium carbonate, calcium acetate, calcium oxide, calcium phosphate, calcium carbide, calcium citrate tetrahydrate, $Ca(NO_3)_2$, zinc hydroxide, zinc carbonate, zinc acetate, zinc oxide, zinc phosphate, zinc powder, zinc citrate dehydrate, nickel carbonate, nickel acetate, nickel oxides, nickel hydroxide, nickel oxalate, cobalt acetate, cobalt oxide, $Co(OH)_2$, cobalt oxalate, copper (II) acetate, copper (II) carbonate, copper (II) oxide, aluminum hydroxide, aluminum carbonate, aluminum acetate, aluminum oxide, boron hydroxide, boron oxide, $B_2O_3$, boron phosphate, chromium acetate, chromium oxide, $Cr_2O_3$, chromium acetylacetonate, $Nb_2O_5$, $Nb(OC_6H_5)_5$ and the like. In addition some of the starting materials can serve as both the source of the polyanion and the source of the metal ion. By way of example, $Fe_3(PO_4)_2$ 8 $H_2O$ can serve as a source of the metal ion (Fe) and a source of the polyanion (phosphate).

Preferred metal ion sources wherein the metal polyanion formed contains one metal ion, are compounds containing an ion of a metal selected from the group consisting of Ti, V, Cr, Mn, Fe, Co, Ni, Cu, Mo, Si, Sn and Pb. In an alternate embodiment wherein the mixed metal polyanion formed contains more than one metal ion, the preferred second metal ion source is a compound containing an ion of a metal selected from the group described above or mixtures thereof; or compounds containing an ion of a metal selected from the group consisting of Be, Mg, Ca, Sr, Ba, Zn, Cd, Ge, Sc, Y, B, Al, Ga, In and mixtures thereof.

The starting materials are mixed in a stoichiometric proportion which provides the desired nominal general formula:

wherein:
(i) A comprises at least one alkali metal selected from the group consisting of Li, Na, K, and mixtures thereof and $0 < a \leq 6$;
(ii) MI comprises a metal ion of a metal selected from the group consisting of Ti, V, Cr, Mn, Fe, Co, Ni, Cu, Mo, Si, Sn, Pb and mixtures thereof and $0 < b \leq 4$;
(iii) MII comprises a metal ion of a metal selected from the group consisting of Be, Mg, Ca, Sr, Ba, Zn, Cd, Ge, Sc, Y, B, Al, Ga and mixtures thereof and $0 \leq c \leq 4$;
(iv) $XY_4$ is selected from the group consisting of $X'[O_{4-x}Y'_x]$, $X'[O_{4-y}Y'_{2y}]$, $X''S_4$, $[X_z''', X'_{1-z}]O_4$ and mixtures thereof wherein:
  (a) X' and X''' are each independently selected from the group consisting of P, As, Sb, Si, Ge, S and mixtures thereof;
  (b) X'' is selected from the group consisting of P, As, Sb, Si, Ge, V and mixtures thereof;
  (c) Y' is selected from the group consisting of a halogen, and mixtures thereof; and
  (d) $0 \leq x \leq 3$, $0 < y < 2$, and $0 < z < 1$; and
(i) Z is selected from the group consisting of OH, a halogen and mixtures thereof, and $0 < d \leq 6$;

wherein A, M, X, Y, Z, a, b, x, y, z, c and d are selected so as to maintain electroneutrality of the material. In a preferred embodiment the amount of polyanion source is added in excess of the stoichiometric proportion. A preferred excess is in an amount from about 0.1% to about 4% and more preferably is an excess in amount from about 0.5% to about 2%.

In preferred embodiments this invention relates to a method of preparing compounds of the nominal general formula: $LiFePO_4$, $Li_3V_2(PO_4)_3$, $Li_{3.03}$ $V_2(PO_4)_{3.09}$ and $LiFe_{1-x}Mg_xPO_4$.

The term milling as used herein often times specifically refers to ball milling. However, it is understood by those skilled in the art, that the term as used herein and in the claims can encompass processes similar to ball milling which would be recognized by those with skill in the art. For instance, the starting materials can be blended together, put in a commercially available muller and then the materials can be mulled. Alternatively, the starting materials can be mixed by high shear and/or using a pebble to mix the materials in a slurry form.

In a preferred process the polymer is added to the solvent and stirred until the polymer is dissolved. This stirring of the solution until the polymer dissolves can be completed in about 1 minute to about 10 hours and preferably from about 2 minutes to about 5 hours. The polyanion source is then added with stirring to form a slurry A. The slurry is again stirred from about 1 minute to about 10 hours and preferably from about 2 minutes to about 5 hours. In a preferred embodiment the polyanion source is lithium hydrogen phosphate which is soluble in the solvent. The metal ion source is then added with stirring from about 1 minute to about 10 hours and more preferably from about 2 minutes to about 5 hours. One skilled in the art will recognize that stirring times can vary depending on factors such as temperature and size of the reaction vessel and amounts and choice of starting materials. The stirring times can be determined by one skilled in the art based on the guidelines given herein and choice of reaction conditions and the sequence that the starting materials are added to the slurry.

The slurry, containing the solvent, the polymer, the polyanion and the metal, are heated at a temperature greater than the boiling point of the solvent. Typically the slurry is heated at a temperature of about 80° C. to about 200° C., more preferably at about 100° to about 150° C., and most preferably at about 110° C. The heating is carried out over a period of time to evaporate essentially all of the solvent and to produce an essentially dried mixture. Typically the slurry is heated over a time period of from about 2 hours to about 48 hours, more preferably from about 6 hours to about 24 hours, and preferably for about 12 hours. After such heating step an essentially dried mixture is formed.

The dried mixture is then milled, mulled or milled and mulled for about 4 hours to about 24 hours, preferably from about 12 to about 24 hours and more preferably for about 12 hours. The amount of time required for milling is dependent on the intensity of the milling. For example, in small testing equipment the milling takes a longer period of time then is needed with industrial equipment.

The milled mixture is then heated in an inert atmosphere, such as nitrogen or argon. The mixture is heated at a temperature from about 650° C. to about 1000° C., preferably from about 700° C. to about 900° C. and more preferably at about 900° C. The heating period is from about 1 hour to about 24 hours and preferably from about 4 to about 16 hours and more preferably about 8 hours. The heating rate is typically about 2° C. per minute to about 5° C. per minute and preferably about 2° C. per minute.

Optionally the mixture can be heated in two steps. The mixture can first be heated at a temperature from about 250° C. to about 600° C. and more preferably from about 300° C. to about 500° C. and preferably at about 400° C. The initial heating period is from about 1 hour to about 24 hours and preferably from about 2 to about 12 hours and more preferably about 2 hours. The heating rate is typically about 2° C. per minute to about 5° C. per minute and preferably about 2° C. per minute.

Although the initial step is optional it is believed, without being limited thereto, that such initial heating step may be beneficial in producing a product with electrochemical performance that is better than a product without such an initial heating step. It is believed that this is because the initial heating step removes essentially all of the moisture so that in the second heating step the starting materials can react more completely. This initial heating step may especially be more beneficial in larger furnaces where any remaining solvent or water may go to the bottom of the furnace.

Preferably the metal polyanions and mixed metal polyanions produced by the above steps are cooled slowly at a fixed rate. Preferably the polyanions are cooled at a rate of about 2° C. per minute to about 3° C. per minute. More preferably the materials are cooled at a rate of about 2° C. per minute.

In another embodiment of the invention it has now surprisingly been found these classes of compounds, and compounds similar to those disclosed in U.S. Pat. No. 6,528,033 B1 can be prepared in a beneficial manner to produce materials with high electron conductivity without the use of a solvent. The method employs a polymeric material which acts a phase separation inhibitor in the dry mix method. The polymeric material also acts to form a conductive network throughout the materials produced by the process of the present invention due to the melting and or decomposition of the polymer during the process and distribution of the decomposed polymer throughout the final product. It has been found that materials so produced exhibit high electronic conductivity when used as the active materials in electrodes, preferably as cathodes.

In one embodiment of the invention a metal polyanion or mixed metal polyanion is produced by a dry mix method. The process comprises forming a mixture comprising a polymeric material, a polyanion source and a source of at least one metal ion and heating the mixture so formed, drying and milling the material so produced and heating the resulting product to produce an electroactive metal polyanion or an electroactive mixed metal polyanion. The sources and reactions conditions other than the solvents and those that follow are the same as described for the solvent process described above.

The milled mixture is heated in an inert atmosphere, such as nitrogen or argon. The mixture is heated at a temperature from about 650° C. to about 1000° C., preferably from about 700° C. to about 900° C. and more preferably at about 900° C. The heating period is from about 1 hour to about 24 hours and preferably from about 4 to about 16 hours and more preferably about 8 hours. The heating rate is typically about 2° C. per minute to about 5° C. per minute and preferably about 2° C. per minute.

Optionally the mixture can be heated in two steps after the drying and milling. The mixture can first be heated at a temperature from about 250° C. to about 600° C. and more preferably from about 300° C. to about 500° C. and preferably at about 400° C. The initial heating period is from about 1 hour to about 24 hours and preferably from about 2 to about 12 hours and more preferably about 2 hours. The heating rate is typically about 2° C. per minute to about 5° C. per minute and preferably about 2° C. per minute.

Although the initial step is optional it is believed, without being limited thereto, that such initial heating step may be beneficial in producing a product with electrochemical performance that is better than a product without such an initial heating step. It is believed that this is because the initial heating step removes essentially all of the moisture so that in the second heating step the starting materials can react more completely.

By way of further example, the first step of the process comprises mixing a polymeric material, such as polyethylene oxide (PEO) having a melting point of approximately 150° C. (PEO with a MW of 20,000), a polyanion source, such as $LiH_2PO_4$, and a metal ion source such as $V_2O_3$ to form a mixture. The mixture is then blended using a high speed blender to produce a fine mixture. The fine mixture is then heated. In a preferred embodiment wherein the polymeric material is PEO or PEG the mixture is heated to 110° C. The resulting material is dried and ball milled. The resulting material is then heated under argon gas at 400° C. for two hours and then further heated at 900° C. for 8 hours than cooled to room temperature. The powder is then milled and sieved to the desired particle size to produce a metal phosphate or mixed metal phosphate material with high electronic conductivity.

Without being limited hereby, it is believed that the polymeric material acts as a phase separation inhibitor during drying, heating and firing. In addition when used as such the polymeric material acts as an electron conductivity promoter in the final products in that upon melting or decomposing the polymeric material forms a conductive network throughout the product. The polymeric material additionally serves as a mix aid during the process by holding the reactants tightly together resulting in highly condensed products that have a higher tap density than materials made by the previous method of the '033 patent.

By way of example, in the preparation of lithium vanadium phosphate using the method of the present invention, (outlined above and more fully described in detail in the Examples) the preferred polymeric material, polyethylene oxide (PEO) or polyethylene glycol (PEG) is added to a mixture of a polyanion source, lithium hydrogen phosphate (LHP) and a metal ion source ($V_2O_3$). The resulting mixture is then blended using a high speed blender to produce a fine mixture. The fine mixture is then heated. The resulting mixture is then ball milled. The material is then heated under argon at 900° C. to form the desired product. The product can then be hammer milled and sieved to the desired particle size.

It is believed without being limited thereby that during drying, heating and firing, the polymeric material serves as a "holder" by holding the LHP on the surface of the $V_2O_3$. In doing this, the reaction between the LHP and $V_2O_3$ can be more efficient, go further to completion without phase separation occurring among the reactants. During the processing the polymeric material melts or decomposes and changes substance form from liquid, to gel, to solid and forms a conductive network throughout the materials produced.

The term blending as used is a conventional procedure known to those with skill in the art using a high speed blender. However it is understood by those skilled in the art that the term as used herein and in the claims can encompass processes similar to blending which would be recognized by those with skill in the art, such as a V-blender and the like. The materials are blended for a period of time from about 4 minutes to about 16 hours and more preferably from about 30 minutes to about 2 hours.

The dried mixture is then milled, mulled or milled and mulled for about 8 hours to about 24 hours, preferably from about 12 to about 24 hours and more preferably for about 12 hours. The amount of time required for milling is dependent on the intensity of the milling. For example, in small testing equipment the milling takes a longer period of time then is needed with industrial equipment.

The milled mixture is then heated in an inert atmosphere, such as nitrogen or argon. The mixture is heated at a temperature from about 650° C. to about 1000° C., preferably from about 700° C. to about 900° C. and more preferably at about 900° C. The heating period is from about 4 hours to about 24 hours and preferably from about 4 to about 24 hours and more preferably about 8 hours. The heating rate is typically about 2° C. per minute to about 5° C. per minute and preferably about 2° C. per minute.

Preferably the metal polyanions and mixed metal polyanions produced by the above steps are cooled slowly at a fixed rate. Preferably the polyanions are cooled at a rate of about 2° C. per minute to about 3° C. per minute. More preferably the materials are cooled at a rate of about 2° C. per minute.

In preferred embodiments this invention relates to a method of preparing compounds of the nominal general formula: $LiFePO_4$, $Li_3V_2(PO_4)_3$, $Li_{3.03}V_2(PO_4)_{3.09}$ and $LiFe_{1-x}Mg_xPO_4$.

The lithium metal phosphates and lithium mixed metal phosphate of the present invention are usable as electrode active materials, for lithium ion ($Li^+$) removal and insertion. These electrodes are combined with a suitable counter electrode to form a cell using conventional technology known to those with skill in the art. Upon extraction of the lithium ions from the lithium metal phosphates or lithium mixed metal phosphates, significant capacity is achieved.

The electroactive metal polyanion or the electroactive mixed metal polyanion produced by the processes of the present invention can further be milled and sieved to the desired particle size. The particle size is preferably from about 2 µm to about 10 µm and more preferably from about 2 µm to about 5 µm.

The following is a list of some of the definitions of various terms used herein:

As used herein "battery" refers to a device comprising one or more electrochemical cells for the production of electricity. Each electrochemical cell comprises an anode, cathode, and an electrolyte.

As used herein the terms "anode" and "cathode" refer to the electrodes at which oxidation and reduction occur, respectively, during battery discharge. During charging of the battery, the sites of oxidation and reduction are reversed.

As used herein the tern "nominal formula" or "nominal general formula" refers to the fact that the relative proportion of atomic species may vary slightly on the order of 2 percent to 5 percent, or more typically, 1 percent to 3 percent.

As used herein the words "preferred" and "preferably" refer to embodiments of the invention that afford certain benefits under certain circumstances. Further the recitation of one or more preferred embodiments does not imply that other embodiments are not useful and is not intended to exclude other embodiments from the scope of the invention.

The following is a list of some of the abbreviations and the corresponding meanings as used interchangeably herein:

C/5 rate=5 hour rate
mAh/g=milliamp hours per gram
XRD=x-ray diffraction

The following Examples are intended to be merely illustrative of the present invention, and not limiting thereof in either scope or spirit. Those with skill in the art will readily understand that known variations of the conditions and processes described in the Examples can be used to synthesize the compounds of the present invention.

Unless otherwise indicated all starting materials and equipment employed were commercially available.

EXAMPLE 1

Preparation of LVP by Wet Mixing

Polyethylene glycol (10 g, MW 2,000) and PEO (2 g) were added to $H_2O$ (50 g) while stirring to produce a solution A. $LiH_2PO_4$ (50 g) was added to solution A while stirring to produce a slurry B. $V_2O_3$ (23.79 g) was added to slurry B while stirring to produce slurry C. Slurry C was placed in a glass container and the mixture was heated to 110° C. for 12 hours to form a dried mixture.

The resulting dried mixture was then ball-milled for 12 hours. The resulting material was then heated to 400° C. at a rate of 3° C./minute and then heated at 400° C. for two hours under argon (Ar) gas. The material was further heated to 900° C. at a rate of 5° C./minute under argon gas and then heated at 900° C. for 8 hours. The material was then cooled to room temperature at a rate of 50 C./minute. The material was then hammer milled and sieved to the desired particle size between about 2 and about 30µm for electrochemical testing and characterization.

FIG. 1 shows the XRD of the material so produced.

FIG. 2 shows the voltage vs. time profile of the polymeric LVP so produced.

FIG. 3 shows the cycling behavior and voltage profile of the polymeric LVP at C/2.

Testing Data:
Tap density: 1.758 g/ml
Residual carbon: ~0.5%
Resistivity ($ohm^{-cm}$): 1.78E+03

EXAMPLE 2

Preparation of LVP by Wet Mixing (5 kg Batch)

Polyethylene glycol (400 g, MW 1,000) and PEO (20 g) was added to $H_2O$ (3600 g) while stirring to produce a solution A. $LiH_2PO_4$ (4000 g) was added to solution A while stirring to produce a slurry B. $V_2O_3$ (1903.2 g) was added to slurry B while stirring to produce slurry C. Slurry C was placed in a glass container and the mixture was heated to 110° C. and then heated at 110° for 12 hours to form a dried mixture.

The resulting dried mixture was then mulled for 12 hours and then ball milled for 12 hours. The resulting material was then heated to 400° C. at a rate of 3° C./minute and then heated at 400° C. for two hours under argon (Ar) gas. The material was further heated to 900° C. at a rate of 5° C./minute under argon gas and then heated at 900° C. for 8 hours. The material was then cooled to room temperature at a rate of 5° C./minute. The material was then hammer milled and sieved to the desired particle size for electrochemical testing and characterization.

FIG. 4 shows the XRD of the material so produced.

FIG. 5 shows the voltage vs. time profile of the polymeric LVP so produced.

FIG. 6 shows the cycling behavior and voltage profile of the polymeric LVP at C/2.

Testing Data:
Tap density: 1.156 g/ml
Residual carbon: ~0.5%
Resistivity ($ohm^{-cm}$): 3.4E+03

EXAMPLE 3

Preparation of LVP by Wet Mixing (Super-P Carbon)

PEO (1.8 g, MW 20,000) was added to $H_2O$ (100 g) while stirring to produce a solution A. $LiH_2PO_4$ (100 g) was added to solution A while stirring to produce a slurry B. $V_2O_3$ (47.58 g) was added to slurry B while stirring to produce slurry C. Super-P carbon black (4.8 g) was then added to slurry C while stirring to produce slurry D. Slurry D was placed in a glass container and the mixture was heated to 110° C. and then heated at 110° C. for 12 hours to form a dried mixture.

The resulting dried mixture was then mulled for 12 hours and then ball milled for 12 hours. The resulting material was then heated to 400° C. at a rate of 30° C./minute and then heated at 400° C. for two hours under argon (Ar) gas. The material was further heated to 900° C. at a rate of 5° C./minute under argon gas and then heated at 900° C. for 8 hours. The material was then cooled to room temperature at a rate of 5° C./minute. The material was then hammer milled and sieved to the desired particle size for electrochemical testing and characterization.

FIG. 7 shows the XRD of the material so produced.

FIG. 8 shows the cycling behavior of the polymeric LVP at a current rate of C/2.

Testing Data:
Tap density: 1.40 g/ml
Residual carbon: ~4.0%
Resistivity ($ohm^{-cm}$): 8.57E+00

EXAMPLE 4

Preparation of LiFe$_{0.95}$Mg$_{0.05}$PO$_4$ by Wet Mixing (Super-P Carbon)

PEO (10 g, MW 20,000) was added to H$_2$O (200 g) while stirring to produce a solution A. LiH$_2$PO$_4$ (104.6 g) and Mg(OH)$_2$ (2.9 g) were added to solution A while stirring to produce a slurry B. Fe$_2$O$_3$ (80 g) was added to slurry B while stirring to produce slurry C. Super-P carbon black (2.0 g) was then added to slurry C while stirring to produce slurry D. Slurry D was the blended by high speed blender and then placed in a glass container. The mixture was heated to 110° C. and then heated at 110° C. for 12 hours to form a dried mixture.

The resulting dried mixture was then mulled for 12 hours and then ball milled for 12 hours. The resulting material was then heated to 30° C. at a rate of 1° C./minute and then heated at 30° C. for fifteen minutes under argon (Ar) gas. The material was further heated to 85° C. at a rate of 2° C./minute under argon gas and then heated at 85° C. for 20 minutes. The material was further heated to 750° C. at a rate of 2° C./minute under argon gas and then heated at 750° C. for 4 hours. The material was then cooled to room temperature (21° C.) at a rate of 2° C./minute. The material was then hammer milled and sieved to the desired particle size for electrochemical testing and characterization.

FIG. 9 shows the XRD of the material so produced.

Testing Data:
Tap density: 1.8 g/ml
Residual carbon: ~2.5%
Resistivity (ohm$^{-cm}$): 2.3E+00

EXAMPLE 5

Preparation of LVP (Dry Mixing)

PEO (50 g, MW 20,000) was added to a mixture of LiH$_2$PO$_4$ (250 g) and V$_2$O$_3$ (118.1 g). The resulting mixture was then blended using a high speed blender to produce a fine mixture. The mixture was then placed into a glass container and heated to 110° C. The mixture was heated at 110° C. for 12 hours. The resulting mixture was then ball milled for 4 hours. The resulting material was then heated to 400° C. at a rate of 3° C./minute and then heated at 400° C. for 2 hours under argon gas. The material was then heated to 900° C. at a rate of 5° C./minute under argon gas then heated at 900° C. for 8 hours. The material was then cooled to room temperature at a rate of 5° C./minute. The material was then hammer milled and sieved to the desired particle size for further electrochemical testing.

FIG. 10 shows the XRD of the material so produced FIG. 11 shows the cycling behavior of the material at a current rate of C2.

EXAMPLE 6

Preparation of LVP (Dry Mixing—Super-P)

PEO (50 g, MW 20,000) was added to a mixture of LiH$_2$PO$_4$ (250 g), V$_2$O$_3$ (118.1 g) and Super-P carbon black (3.6 g). The resulting mixture was then blended using a high speed blender to produce a fine mixture. The mixture was then placed into a glass container and heated to 110° C. The mixture was heated at 110° C. for 12 hours. The resulting mixture was then ball milled for 4 hours. The resulting material was then heated to 400° C. at a rate of 3° C./minute and then heated at 400° C. for 2 hours under argon gas. The material was then heated to 900° C. at a rate of 5° C./minute under argon gas then heated at 900° C. for 8 hours. The material was then cooled to room temperature at a rate of 5° C./minute. The material was then hammer milled and sieved to the desired particle size for further electrochemical testing.

FIG. 12 shows the XRD of the material so produced FIG. 13 shows the cycling behavior of the material at a current rate of C/2.

EXAMPLE 7

Preparation of LVP (Wet Mixing—EHEC)

Ethyl hydroxyl ethyl cellulose (EHEC) (40 g, MW 1,000) was added to H$_2$O (360 g) while stirring to produce a solution A. LiH$_2$PO$_4$ (400 g) was added to solution A while stirring to produce a slurry B. V$_2$O$_3$ (190.3 g) was added to slurry B while stirring to produce slurry C. Slurry C was placed in a glass container and the mixture was heated to 110° C. and then heated at 110° C. for 12 hours to form a dried mixture.

The resulting dried mixture was then mulled for 12 hours and then ball milled for 12 hours. The resulting material was then heated to 400° C. at a rate of 3° C./minute and then heated at 400° C. for two hours under argon (Ar) gas. The material was further heated to 900° C. at a rate of 5° C./minute under argon gas and then heated at 900° C. for 8 hours. The material was then cooled to room temperature at the rate of 5° C./minute. The material was then hammer milled and sieved to the desired particle size between 2 and 30 μm for electrochemical testing and characterization.

FIG. 14 shows the cycling behavior of the material at a current rate of C/2.

EXAMPLE 8

Preparation of LVP (Wet Mixing PEG)

Polyethylene glycol (PEG) (100 g, MW 1000) was added to H$_2$O (900 g) while stirring to produce a solution A. LiH$_2$PO$_4$ (1000 g) was added to solution A while stirring to produce a slurry B. V$_2$O$_3$ (475.8 g) was added to slurry B while stirring to produce a slurry C. Slurry C was placed in a glass container and the mixture was heated to 110° C. for 12 hours to form a dried mixture. (PEG MW 1000 has a melting point of approximately 30° C. so it is in liquid phase at room temperature).

The resulting dried mixture was then ball milled for 12 hours. The resulting material was then heated to 400° C. at a rate of 3° C./minute and then heated at 400° C. for 2 hours under argon (Ar) gas. The material was then further heated to 900° C. for 8 hours. The material was then cooled to room temperature at a rate of 5° C./minute under argon gas. The material was then cooled to room temperature at a rate of 5° C./minute. The material was then hammer milled and sieved to the desired particle size between 2 and 30 μm for electrochemical testing and characterization.

FIG. 15 shows the cycling behavior of the material at a current rate of C/2.

The compounds produced by the above described methodology find use as active materials for electrodes in ion batteries and more preferably in lithium ion batteries. The lithium metal phosphates and lithium mixed metal phosphates produced by the present invention are useful as active materials in electrodes of batteries, and more preferably are useful as active materials in positive electrodes (cathodes). When used in the positive electrodes of lithium ion batteries these active materials reversibly cycle lithium ions with the compatible negative electrode active material.

The active material of the compatible counter electrodes is any material compatible with the lithium metal phosphates or lithium mixed metal phosphates of the materials of the present invention. The negative electrode can be made from conventional anode materials known to those skilled in the art. The negative electrode can be comprised of a metal oxide, particularly a transition metal oxide, metal chalcogenide, carbon, graphite, and mixtures thereof.

A typical laminated battery in which such material can be employed includes, but is not limited to batteries disclosed in the '033 patent. For example a typical bi-cell can comprise a negative electrode, a positive electrode and an electrolyte/separator interposed between the counter electrodes. The negative and positive electrodes each include a current collector. The negative electrode comprises an intercalation material such as carbon or graphite or a low voltage lithium insertion compound, dispersed in a polymeric binder matrix, and includes a current collector, preferably a copper collector foil, preferably in the form of an open mesh grid, embedded in one side of the negative electrode. A separator is positioned on the negative electrode on the side opposite of the current collector. A positive electrode comprising a metal phosphate or mixed metal phosphate of the present invention is positioned on the opposite side of the separator from the negative electrode. A current collector, preferably an aluminum foil or grid, is then positioned on the positive electrode opposite the separator. Another separator is positioned on the side opposite the other separator and then another negative electrode is positioned upon that separator. The electrolyte is dispersed into the cell using conventional methods. In an alternative embodiment two positive electrodes can be used in place of the two negative electrodes and then the negative electrode is replaced with a positive electrode. A protective bagging material can optionally cover the cell and prevent infiltration of air and moisture. U.S. Pat. No. 6,528,033 B1, Barker et al. is hereby incorporated by reference.

The electrochemically active compounds of the present invention can also be incorporated into conventional cylindrical electrochemical cells such as described in U.S. Pat. No. 5,616,436, U.S. Pat. No. 5,741,472 and U.S. Pat. No. 5,721,071 to Sonobe et al. Such cylindrical cells consist of a spirally coiled electrode assembly housed in a cylindrical case. The spirally coiled electrode assembly comprises a positive electrode separated by a separator from a negative electrode, wound around a core. The cathode comprises a cathode film laminated on both sides of a thick current collector comprising a foil or wire net of a metal.

An alternative cylindrical cell as described in U.S. Pat. No. 5,882,821 to Miyasaka can also employ the electrochemically active materials produced by the method of the present invention. Miyasaka discloses a conventional cylindrical electrochemical cell consisting of a positive electrode sheet and a negative electrode sheet combined via a separator, wherein the combination is wound together in spiral fashion. The cathode comprises a cathode film laminated on one or both sides of a current collector.

The active materials produced by the method of the present invention can also be used in an electrochemical cell such as described in U.S. Pat. No. 5,670,273 to Velasquez et al. The electrochemical cell described therein consists of a cathode comprising an active material, an intercalation based carbon anode, and an electrolyte there between. The cathode comprises a cathode film laminated on both sides of a current collector.

While this invention has been described in terms of certain embodiments thereof, it is not intended that it be limited to the above description. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making an electroactive metal polyanion or an electroactive mixed metal polyanion comprising the steps of:
    forming a mixture comprising a solvent having a boiling point, a polyanion source, a source of at least one metal ion and a polymeric material wherein the polymeric material forms a solution with the solvent without substantial phase separation;
    heating the mixture at a temperature greater than the boiling point of the solvent for a period of time sufficient to remove substantially all of the solvent to produce an essentially dried mixture;
    heating the dried mixture at a temperature and for a period of time sufficient to produce an electro active metal polyanion or an electro active mixed metal polyanion.

2. The method according to claim 1 wherein the mixture or dried mixture further comprises a carbon source.

3. The method according to claim 1 wherein the polymeric material has decomposed to form an electron conductive network throughout the metal polyanion or mixed metal polyanion.

4. The method according to claim 1 wherein the solvent is selected from the group consisting of water, deionized water, PC, BC, DMF, DME, THF, BL, NMP, DMSO and mixtures thereof.

5. The method according to claim 1 wherein at least one alkali metal containing compound is added to the mixture.

6. The method according to claim 5, wherein the polyanion source is polyanion-containing compound selected from the group consisting of a $PO_4$-containing compound, a $SiO_4$ containing compound, a $GeO_4$-containing compound, a $VO_4$-containing compound, an $AsO_4$-containing compound, a $SbO_4$-containing compound, and a $SO_4$-containing compound.

7. The method according to claim 6 wherein the polyanion-containing compound is a $PO_4$-containing compound.

8. The method according to claim 7 wherein the $PO_4$-containing compound is selected from the group consisting of diammonium hydrogen phosphate, ammonium dihydrogen phosphate, lithium dihydrogen phosphate and mixtures thereof.

9. The method according to claim 1 wherein the source of at least one metal ion is a compound of a metal selected from the group consisting of Ti, V, Cr, Mn, Fe, Co, Ni, Cu, Mo, Si, Sn, Pb and mixtures thereof.

10. The method according to claim 9 wherein there is a second metal ion source.

11. The method according to claim 10 wherein the source of the second metal ion is a compound of a metal selected from the group consisting of Be, Mg, Ca, Sr, Ba, Zn, Cd, Ge and mixtures thereof.

12. The method according to claim 10 wherein the source of the second metal ion is a compound of a metal selected from the group consisting of Sc, Y, B, Al, Ga, In, and mixtures thereof.

13. The method according to claim 1 wherein during the heating steps the polymeric material decomposes to form an electron conductive network throughout the metal polyanion or mixed metal polyanion.

14. The method according to claim 1 wherein the metal polyanion produced is lithium vanadium phosphate.

15. The method according to claim 14 wherein the polyanion source is $LiH_2PO_4$.

16. The method according to claim 15 wherein the source of at least one metal ion is $V_2O_3$.

17. The method according to claim 16 wherein the polymeric material is selected from the group consisting of PEG, PEG and EHEC.

18. The method according to claim 17 wherein the mixture further comprises a carbon source.

19. The method according to claim 1 wherein the mixed metal polyanion produced is of the formula $LiFe_{1-x}Mg_xPO_4$ wherein x is from about 0.01 to about 0.1.

20. The method according to claim 19 wherein the source of at least one metal ion is $Fe_2O_3$.

21. The method according to claim 20 wherein the polyanion source is $LiH_2PO_4$.

22. The method according to claim 21 wherein the mixture further comprises a second metal ion source.

23. The method according to claim 22 wherein the second metal ion source is magnesium hydroxide.

24. The method according to claim 22 wherein the polymeric material is selected from the group consisting of PEO, PEG and EHEC.

25. The method according to claim 24 wherein the mixture further comprises a carbon source.

26. The method according to claim 25 wherein the heating step is performed in a non-oxidizing atmosphere.

27. The method according to claim 26 wherein the non-oxidizing atmosphere comprises a gas selected from the group consisting of nitrogen, argon, carbon dioxide, carbon monoxide; and mixtures thereof.

28. The method according to claim 26 wherein the non-oxidizing atmosphere is a vacuum.

29. A method for making an lithium vanadium phosphate comprising the steps of:

forming a mixture comprising $LiH_2PO_4$, $V_2O_3$ and a polymeric material selected from the group consisting of PEO, PEG and EHEC wherein the polymeric material acts as a phase separation inhibitor and as a mix aid by holding the reactants tightly together;

blending the mixture;

heating the mixture at a temperature and for a period of time sufficient to produce lithium vanadium phosphate.

30. The method according to claim 29 wherein the mixture further comprises a carbon source.

31. The method according to claim 30 wherein the polymeric material decomposes to form an electron conductive network throughout the lithium vanadium phosphate.

32. The method according to claim 29 wherein during the heating steps the polymeric material decomposes to form an electron conductive network throughout the metal polyanion or mixed metal polyanion.

* * * * *

UNITED STATES PATENT AND TRADEMARK OFFICE
CERTIFICATE OF CORRECTION

| | | |
|---|---|---|
| PATENT NO. | : 7,338,647 B2 | |
| APPLICATION NO. | : 10/850003 | |
| DATED | : March 4, 2008 | |
| INVENTOR(S) | : Biying Huang et al. | |

It is certified that error appears in the above-identified patent and that said Letters Patent is hereby corrected as shown below:

<u>Column 13</u>
Line 59: Delete "50 C/minute" Insert -- 5° C/minute --

<u>Column 14</u>
Line 3:   Delete "-0.5%" Insert -- ~0.5% --

Line 34: Delete "-0.5%" Insert -- ~0.5% --

Line 53: Delete "30° C/minute" Insert -- 3° C/minute --

Signed and Sealed this
Seventeenth Day of May, 2011

David J. Kappos
*Director of the United States Patent and Trademark Office*